(12) United States Patent
Kuchnio et al.

(10) Patent No.: US 12,216,675 B2
(45) Date of Patent: *Feb. 4, 2025

(54) STRUCTURED-DATA ANALYSIS AND VISUALIZATION

(71) Applicant: Veeva Systems Inc., Pleasanton, CA (US)

(72) Inventors: Piotr Kuchnio, Toronto (CA); Marius K. Mortensen, Burlington (CA); Asaf Roll, Richmond Hills (CA); Zhen Tan, North York (CA)

(73) Assignee: Veeva Systems Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/237,876

(22) Filed: Aug. 24, 2023

(65) Prior Publication Data

US 2023/0409592 A1    Dec. 21, 2023

Related U.S. Application Data

(63) Continuation of application No. 17/733,873, filed on Apr. 29, 2022, now Pat. No. 11,789,968, which is a
(Continued)

(51) Int. Cl.
*G06F 16/25* (2019.01)
*G06F 16/22* (2019.01)
(Continued)

(52) U.S. Cl.
CPC ........ *G06F 16/254* (2019.01); *G06F 16/2246* (2019.01); *G06F 16/245* (2019.01); *G06F 16/26* (2019.01)

(58) Field of Classification Search
CPC .. G06F 16/254; G06F 16/245; G06F 16/2246; G06F 16/26
See application file for complete search history.

(56) References Cited

U.S. PATENT DOCUMENTS 9,824,095 B1    11/2017   Taylor et al.
10,860,550 B1   12/2020   Chheda et al.
(Continued)

OTHER PUBLICATIONS

Oracle Argus Safety, User's Guide, Release 8.1.2, E93471-01, Feb. 2018.

*Primary Examiner* — Alicia M Willoughby
(74) *Attorney, Agent, or Firm* — Baker & McKenzie LLP

(57) ABSTRACT

Methods and systems for accessing, maintaining, analyzing, and visualizing structured data are presented. The system receives from a requesting computing device, a first request for a first hierarchical record. The system searches a first repository having first structured data. The system determines whether the first hierarchical record is present in the first structured data and creates, based on the first hierarchical record, a snapshot query criterion. The system then searches, based on the snapshot query criterion, a second repository comprising a first snapshot of the first structured data. The system determines whether a second hierarchical record at least partially matches the first hierarchical record. In response to determining that the first hierarchical record at least partially matches the second hierarchical record, the system determines whether version information associated with the first snapshot of the first structured data is available and transmits information associated with the second hierarchical record.

18 Claims, 18 Drawing Sheets

Related U.S. Application Data continuation of application No. 16/945,769, filed on Jul. 31, 2020, now Pat. No. 11,321,342.

(51) Int. Cl.
  *G06F 16/245* (2019.01)
  *G06F 16/26* (2019.01)

(56) References Cited

U.S. PATENT DOCUMENTS

| | | |
|---|---|---|
| 2010/0082553 A1 | 4/2010 | Beatty et al. |
| 2017/0300552 A1 | 10/2017 | Mandadi et al. |
| 2017/0371750 A1 | 12/2017 | Horowitz et al. |

FIG. 3C

Business Admin | Logs | Users & Groups | Configuration | Operations | Deployment | Connections | Settings Cases ▶ Search Cases Structured Data >

Structured Data: ☆ ACTIVE

▼ Details

Attachments (0)
Workflow Timeline
System Information 1 of 2 records in this list ▲▼

✎ Edit

304 — Structured Data Source: Central

Name: First Structured Data

Active Version: 21.0

License Key:

ID: User ID

Password: User Password

Follow-Up Case Version: Active Version

▼ Attachments

⬆ Upload

Drag and drop files here to upload as attachments

Business Admin  Logs  Users & Groups  Cases ▶ Search Cases  Configuration  Operations  Deployment  Connections  Settings Structured Data >
Structured Data:    Structured Data: ☆ ACTIVE Details
Attachments (1)
Workflow Timeline
System Information ▼ Details 1 of 2 records in this list ▲▼    ✎ Edit   ⚙▶

MANAGE
Change Active
Import Structured Data
Change Type

EDIT
📋 Copy Record
🗒 Configure Page Layout

VIEW
🗑 Delete
📄 Audit Trail

394

Name: First Structured Data
Structured Data Source: Local
Active Version: 21.0
Languages:
License Key:
Follow-Up Case Version:

▼ Attachments
⬇ Download All   ⬆ Upload
📄 21_1_english.zip — 392

▶ Workflow Timeline
▲ System Information

| | | | | | | |
|---|---|---|---|---|---|---|
| Business Admin | Logs | Users & Groups | Configuration | Operations | Deployment | Connections | Settings |

420 — Business Admin > Structured Data > Search All Structured Data

COMPONENT (?) 404
Structured Data

▼ VIEWS
▦ All Structured Data
⏲ Recent Structured Data
☆ Favorites

FILTERS ✏
▶ STRUCTURED DATA TYPE
▶ LAST MODIFIED DATE

All Structured Data (?)   Save View As
+ Create   406

| Name ▲ | Structured Data Type | Active Version | Lifecycle State | Last Modified By | Last Modified Date |
|---|---|---|---|---|---|
| First Structured Data ☆ ⚙ | Structured Data | 21.0 | Active | | 16 Jul 2020 2:52 PM EDT |
| Second Structured Data ☆ | Structured Data | Mar2020 | Active | | 16 Jul 2020 8:45 AM EDT |

| Business Admin | Logs | Users & Groups | Configuration | Operations | Deployment | Connections | Settings | | |
|---|---|---|---|---|---|---|---|---|---|

| COMPONENT | Business Admin > First Structured Data > Search All First Structured Data | | | | | | | |
|---|---|---|---|---|---|---|---|---|
| First Structured Data | All First Structured Data  Save View As | | | | | | | 1-25 of 78 ▼ 1 of 4 ▶ |
| VIEWS | Term ▲ (Code) 502 506 504 | Version | Language | Primary Category | Category Code | Category | High Level Group Term Identifier | High Level Group Term |
| All First Structured Data | Low Level Term 1 ☆ (Low Level Term 1 Identifier) | -,20.0, 21.0 | English | Yes | 10019805 | Hepatobiliary disorders | 10019654 | Hepatic and disorders |
| Recent First Structured Data | Low Level Term 2 ☆ (Low Level Term 2 Identifier) | -,20.0, 21.0 | English | Yes | 10038359 | Renal and urinary disorders | 10038430 | Renal disorders nephropathies |
| ☆ Favorites | Low Level Term 3 ☆ (Low Level Term 3 Identifier) | -,20.0, 21.0 | English | Yes | 10005329 | Blood and lymphatic system disorders | 10047954 | White blood |
| FILTERS | Low Level Term 4 ☆ (Low Level Term 4 Identifier) | -,20.0, 21.0 | English | Yes | 10021428 | Immune system disorders | 10001708 | Allergic cond |
| ▶ VERSION | Low Level Term 5 ☆ (Low Level Term 5 Identifier) | -,20.0, 21.0 | English | Yes | 10021428 | Immune system disorders | 10001708 | Allergic cond |
| ▶ LANGUAGE | Low Level Term 6 ☆ (Low Level Term 6 Identifier) | -,20.0, 21.0 | English | Yes | 10021428 | Immune system disorders | 10001708 | Allergic cond |
| ▶ LAST MODIFIED DATA | Low Level Term 7 ☆ (Low Level Term 7 Identifier) | -,20.0, 21.0 | English | Yes | 10021428 | Immune system disorders | 10001708 | Allergic cond |
| | Low Level Term 8 ☆ (Low Level Term 8 Identifier) | -,20.0, 21.0 | English | Yes | 10040785 | Skin and subcutaneous tissue disorders | 10002426 | Angioedema |
| | Low Level Term 9 ☆ (Low Level Term 9 Identifier) | -,20.0, 21.0 | English | Yes | 10005329 | Blood and lymphatic system disorders | 10002086 | Anaemias and marrow |
| | Low Level Term 10 ☆ (Low Level Term 10 Identifier) | -,20.0, 21.0 | English | Yes | 10005329 | Blood and lymphatic system disorders | 10002086 | Anaemias |

Home Inbox Cases Transmissions ▶ Aggregate Reports ▶ Analytics ▶ Library Action Items ≫ ADMIN ⊕

Inbox▶ | Search Inbox 🔍 | + Create ▶

640 ↗

AERs >

Create AER      Cancel | Save + Create | ✓ Save 626   624

Details

Reporter    ▼ Adverse Event

Patient      Seriousness [▼]

Product

| Adverse Event   Event Onset [YYYY/MM/DD] [▼]

Event (Reported) [As reported (verbatim)] [Reason Omitted] [Auto-code 🔍]

602 [Low Level Term 1 (Low Level Term 1 Identifier)*] ⟵ 622

Clear Selection

Event Country [        🔍]

FIG. 6C

Data Browser

Low Level Term 1 🔍

Terms Hierarchy ❓    Apply ▽

- ▲ Category 1
- ▲ Category 2
- ▲ Category 3
- ▲ Category 4
- ▲ Category 5
- ▲ Category 6
- ▲ Category 7
- ▲ Category 8
- ▲ Category 9
- ▲ Category 10
- ▲ Category 11
- ▲ Category 12
- ▲ Category 13
- ▲ Category 14
- ▲ Category 15
- ▲ Category 16
- ▲ Category 17

Filters: ☑ Only Primary Category

⊞ Results

| Low Level Term | Medium Level Term | High Level Term | High Level Group Term | Category |
|---|---|---|---|---|
| ⦿ Low Level Term 1 | Medium Level Term 1 | High Level Term 1 | High Level Group Term 1 | Category 1 |
| ○ Low Level Term 2 | Medium Level Term 2 | High Level Term 2 | High Level Group Term 2 | Category 2 |
| ○ Low Level Term 3 | Medium Level Term 3 | High Level Term 3 | High Level Group Term 3 | Category 3 |
| ○ Low Level Term 4 | Medium Level Term 4 | High Level Term 4 | High Level Group Term 4 | Category 4 |
| ○ Low Level Term 5 | Medium Level Term 5 | High Level Term 5 | High Level Group Term 5 | Category 5 |
| ○ Low Level Term 6 | Medium Level Term 6 | High Level Term 6 | High Level Group Term 6 | Category 6 |
| ○ Low Level | Medium Level | High Level | High Level | Category 7 |

1-10 of 31   ≪ 1 /4 ≫

Cancel   Confirm

FIG. 7B

STRUCTURED-DATA ANALYSIS AND VISUALIZATION

CROSS-REFERENCE TO RELATED APPLICATIONS

This application is a continuation of U.S. patent application Ser. No. 17/733,873, filed Apr. 29, 2022, which is a continuation of U.S. patent application Ser. No. 16/945,769, filed on Jul. 31, 2020, now U.S. Pat. No. 11,321,342 issued on May 3, 2022, all the disclosures of which are incorporated by reference herein in their entirety for all purposes.

TECHNICAL FIELD

The present disclosure relates to methods and systems for managing, analyzing, and visualizing secured structured data.

BACKGROUND

Researchers, scientists, industry players, academics, government regulators, and other stakeholders are increasingly in need of data that is structured in formats that make the data more accessible, easy to interpret, analyze, and/or visualize.

SUMMARY

Methods and systems for seamlessly accessing, maintaining, analyzing, and visualizing structured data are presented. According to one aspect of this disclosure, the system receives from a requesting computing device, a first request for a first hierarchical record, the first hierarchical record comprising a first first-level field entry, a first second-level field entry, a first third-level field entry, and a first category field entry. The system searches a first repository having a first structured data, for the first hierarchical record. The system then determines whether the first hierarchical record is present in the first structured data comprised in the first repository. In response to determining that the first hierarchical record is present in the first structured data comprised in the first repository, the system creates, based on the first hierarchical record in the first structured data, a snapshot query criteria. The system then searches, based on the snapshot query criteria, a second repository comprising a first snapshot of the first structured data. In one embodiment, the system determines whether a second hierarchical record, comprising a second first-level field entry, a second second-level field entry, a second third-level field entry, and a second category field entry, comprised in the first snapshot of the first structured data at least partially matches the first hierarchical record comprised in the first structured data. In response to determining that the first hierarchical record at least partially matches the second hierarchical record, the system determines whether version information associated with the first snapshot of the first structured data is available. In response to determining that the version information associated with the first snapshot of the first structured data is available, the system transmits to the requesting computing device, information associated with the second hierarchical record.

According to one embodiment, the second hierarchical record comprises the version information. In some cases, the first hierarchical record matching the second hierarchical record comprises matching the first first-level field entry, the first second-level field entry, the first third-level field entry, and the first category field entry to the second first-level field entry, the second second-level field entry, the second third-level field entry, and the second category field entry, respectively. According to some embodiments, the first hierarchical record matching the second hierarchical record comprises matching the first second-level field entry, the first third-level field entry, and the first category field entry to the second second-level field entry, the second third-level field entry, and the second category field entry, respectively. The first structured data in some cases, includes hierarchical data having varying and connected categories that describe a plurality of aspects of the structured data. According to some implementations, the first structured data includes a MedDRA dictionary.

Other implementations of one or more of these aspects include corresponding systems, apparatus, and computer program products, configured to perform the actions of the methods encoded on computer storage devices.

BRIEF DESCRIPTION OF THE DRAWINGS

The disclosure is illustrated by way of example, and not by way of limitation in the figures of the accompanying drawings in which like reference numerals are used to refer to similar elements. The various elements shown in the figures that follow may be optional depending on a given embodiment without departing from the principles provided in this disclosure.

FIGS. 3C-3D depict example user interfaces for selecting and accessing structured data from a centralized repository, according to one embodiment.

FIG. 3E-3F show example interfaces for uploading and saving structured data from a third-party source, according to one embodiment.

FIGS. 4A-4B show example data management interfaces for selecting structured data, according to one embodiment.

FIG. 5 shows an example interface that has a plurality of lowest level terms associated with structured data, according to one embodiment.

FIGS. 6A-6C show example interfaces for coding a lowest level term associated with structured data, according to one embodiment.

FIGS. 7A-7B show example interfaces for displaying a hierarchy of structured data, according to one embodiment.

DETAILED DESCRIPTION

System Environment

Figure 1:
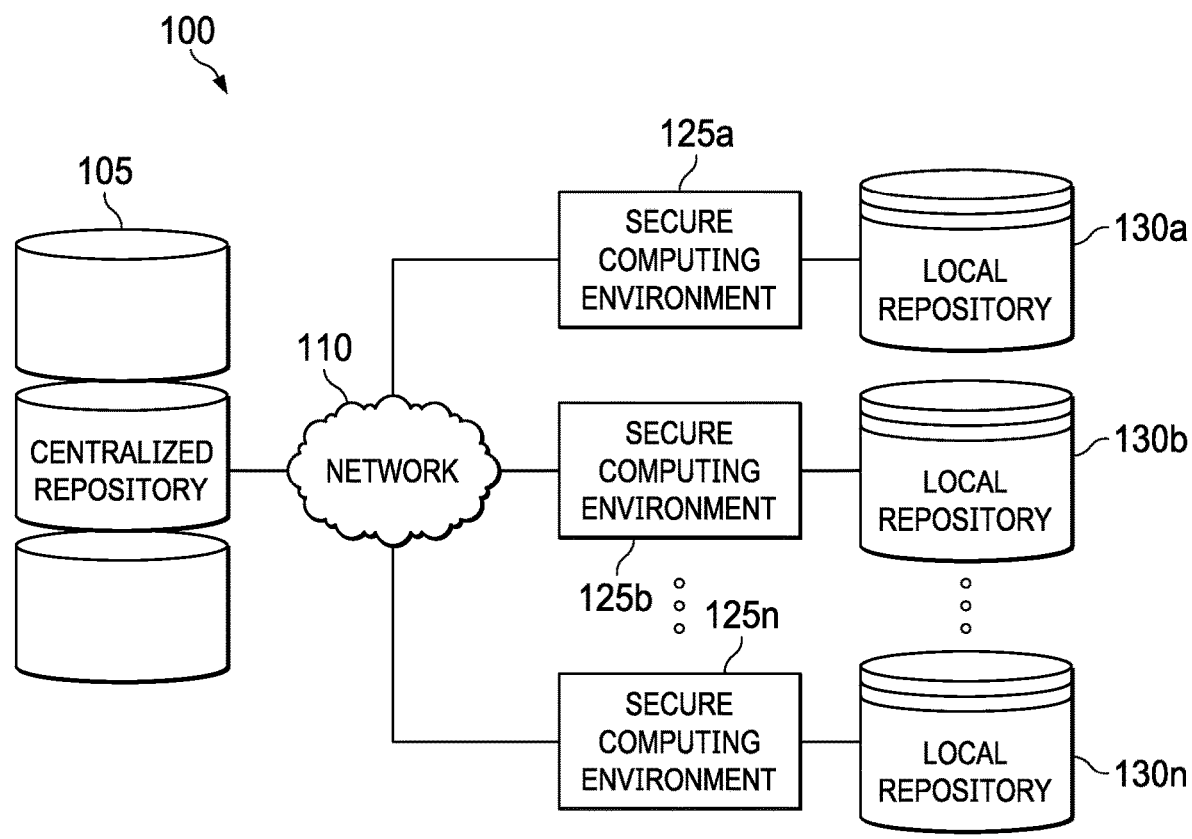
FIG. 1 is a high-level network system for accessing, managing, and visualizing structured data, according to one embodiment.

Illustrated in FIG. 1 is a high level network system 100 for generating interfaces that access, maintain, analyze, and display structured data. In the depicted implementation, the system 100 may include a centralized repository 105 communicatively coupled to a plurality of secure computing environments 125 via the network 110. The secure computing environments 125 may in turn be communicatively coupled to a local repository 130. While a single centralized repository 105 is illustrated, the disclosed principles and techniques could be expanded to include multiple centralized repositories 105.

The centralized repository 105, according to some embodiments, is configured to store a plurality of structured data in a secure environment requiring authentication before access is granted to the structured data. According to one implementation, the structured data includes hierarchical data having varying and connected categories/levels that describe a plurality of aspects of the structured data. In some cases, the structured data in the centralized repository 105 is sourced or obtained from third-party scientific sources, and/or from third-party regulatory agencies, and/or from academic sources, and/or from industrial sources, etc. According to one implementation, the structured data includes terminology data associated with Medical Dictionary for Regulatory Activities ("MedDRA") dictionaries. In addition, the centralized repository 105 may be configured to manage or otherwise maintain the integrity and/or version updates of the structured data so that a user (e.g., a user of the secure computing environment) does not have to deal with such data maintenance processes as the structured data changes and/or grows. In one embodiment, the centralized repository 105 provides (e.g., using a snapshot reference) the most current version of the structured data to a user of the system. In other embodiments, the centralized repository 105 can also provide historical versions of the structured data when necessary or needed. Furthermore, the centralized repository 105 may include mechanisms that execute operations of data decompression operations, data decryption operations, and data decoding operations associated with the structured data so that the user is effectively isolated from such operations.

Moreover, the centralized repository 105 allows for easy associating, tagging, or coding new phenomena/events/cases (e.g., in the medical area or any other area) with structured data from the centralized repository. In some cases, the tagging or coding (e.g., automatic coding interfaces shown in FIGS. 6A-6C) is automatically executed by the centralized repository. In some instances, coding/tagging decisions are snapshotted to the secure computing environment and are not affected by updates occurring at the centralized repository. In one embodiment, the centralized repository enables a user to control version information of the structured data for follow-up cases/events. In addition, the centralized repository allows a user (e.g., user of the secure computing environment 125) to transition from accessing structured data from the local repository 130 to the centralized repository 105.

The centralized repository 105 may be implemented within a computing device such as a mainframe server, a content server, a communication server, a laptop computer, a desktop computer, a handheld computing device, a virtual machine, a cloud-based computing solution and/or service, and/or the like. The centralized repository 105 may include a plurality of computing devices configured to communicate with one another and/or implement the techniques described herein. In some instances, the centralized repository 105 may include various elements of a computing environment as described with reference to FIGS. 2A and/or 2B. For example, the centralized repository 105 may include a processing system 202, a memory 204, an input/output (I/O) system 206, and a communication system 208. A user (e.g., database administrator) may operate/maintain the centralized repository 105 either locally or remotely as the case may require.

The centralized repository 105 may be configured to have storage logic that is executable to store structured data that is shared across multiple secure computing environments 125. According to one implementation, the centralized repository 105 includes a plurality of non-volatile/non-transitory storage media such as solid state storage media, hard disk storage media, virtual storage media, cloud-based storage drives, storage servers, and/or the like. The plurality of storage media may be configured to store data from a plurality of sources. For example, the centralized repository 105 may include storage logic that is executable to store structured data derived from, for example, medical data, research data, education data, government data, etc. According to some implementations, the storage logic of the centralized repository 105 may be configured to automatically monitor and/or update relevant structured data obtained from a third-party source. For example, the storage logic of the centralized repository 105 may periodically monitor updates associated with structured data (e.g., dictionary of medical terms for research and regulatory purposes) from third-party organizations/sources and automatically update different versions of the structured data within one or more storage media of the centralized repository 105. In one embodiment, the storage logic of the centralized repository 105 manipulates or otherwise formats the structured data such that user interfaces generated by a secure computing environment 125 can seamlessly access/retrieve and present the structured data to a user. In addition, structured data from the centralized repository 105 may be accessed on a regulated basis via credential access, for example. This regulated basis may be determined, in part, by licenses, privileges, and other levels of authorization dictated by a user's credentials.

The local repository 130 may include storage logic for storing a local copy of structured data from the centralized repository 105. The local repository 130 may also be configured to store data other than the structured data. For example, the local repository 130 may store data from third-party sources and other data generated by the secure computing environment 125. The local repository may include a plurality of non-volatile/non-transitory storage media such as solid state storage media, hard disk storage media, virtual storage media, cloud-based storage drives, storage servers, and/or the like. According to some embodiments, the local repository 130 may include logic that updates structured data stored within its storage devices based on updates to structured data stored within the centralized repository 105. In some cases, snapshots of structured data may be accessed using the secure computing environment 125 so that updates associated with the snapshots may be effected on the local repository 130.

As previously discussed, the network 110 facilitates communication between the centralized repository 105 and the secure computing environment 125. The network 110 may also allow different secure computing environments 125 to communicate with each other. According to one embodiment, the network 110 may include a plurality of networks. For instance, the network 110 may include any wired/wireless communication network that facilitates communication between the components of the network system 100. The network 110, in some instances, may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a fiber optics network, a laser-based network, and/or the like.

The secure computing environment 125 is configured to generate one or more user interfaces for accessing, analyzing, and displaying the structured data. According to some implementations, the secure computing environment 125 includes functionalities and/or enhanced security features that allow a user to securely access and/or securely manage structured data. As shown more clearly in the exemplary functional and system diagrams of FIGS. 2A and 2B, the secure computing environment 125 includes a processing system 202, a memory 204, an I/O system 206, and a communication system 208. The processing system 202, the memory 204, the I/O system 206, and the communication system 208 may include one or more subsystems that perform one or more of the operations described herein. Additionally, each system of the secure computing environment 125 may be operatively and/or otherwise communicatively coupled with each other so as to facilitate one or more operations described herein. The secure computing environment 125 may include general hardware, specifically-purposed hardware, and/or a combination thereof.

Figure 2A:
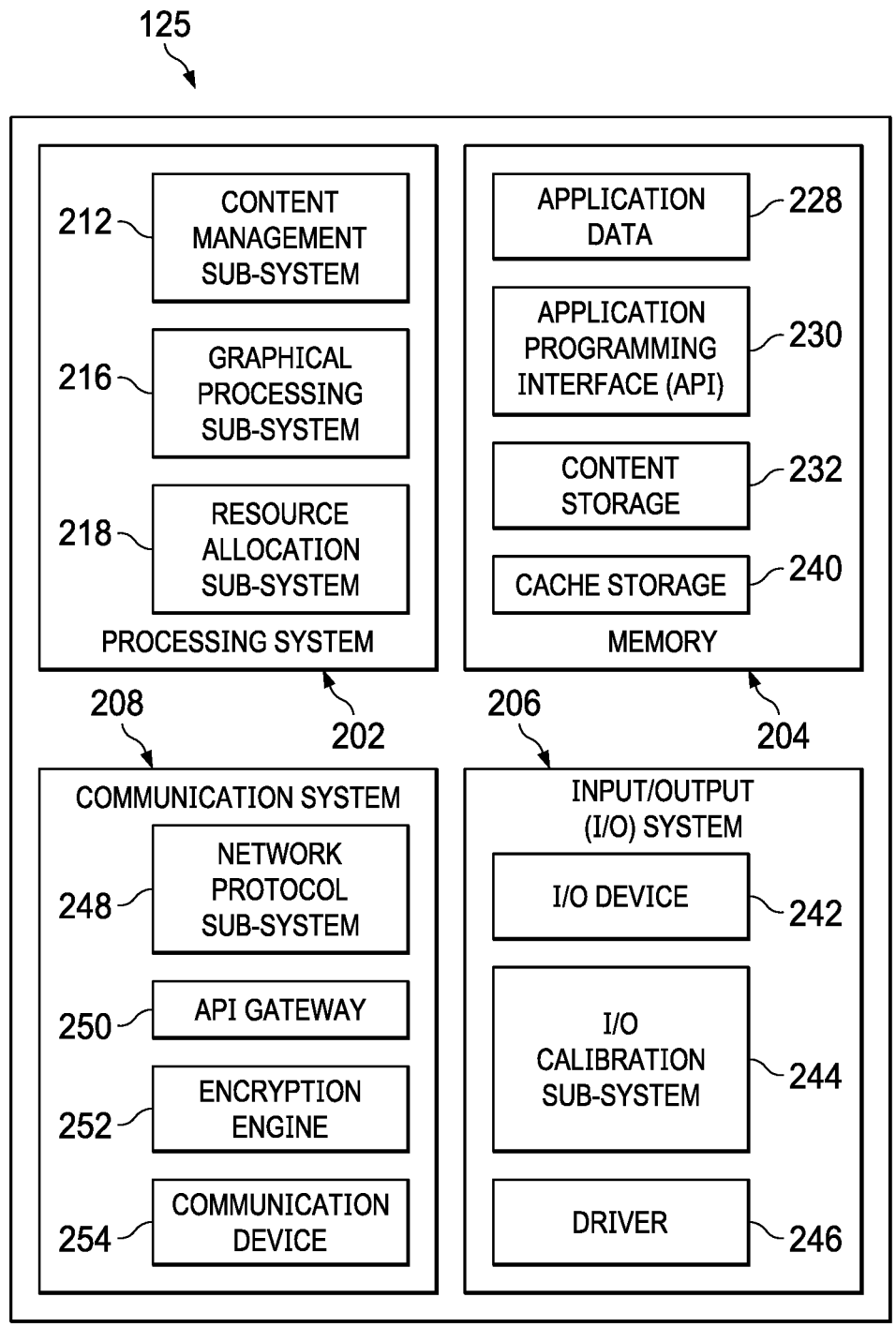
FIG. 2A is a functional block diagram of a computing environment for accessing and visualizing structured data, according to one embodiment.
Figure 2B:
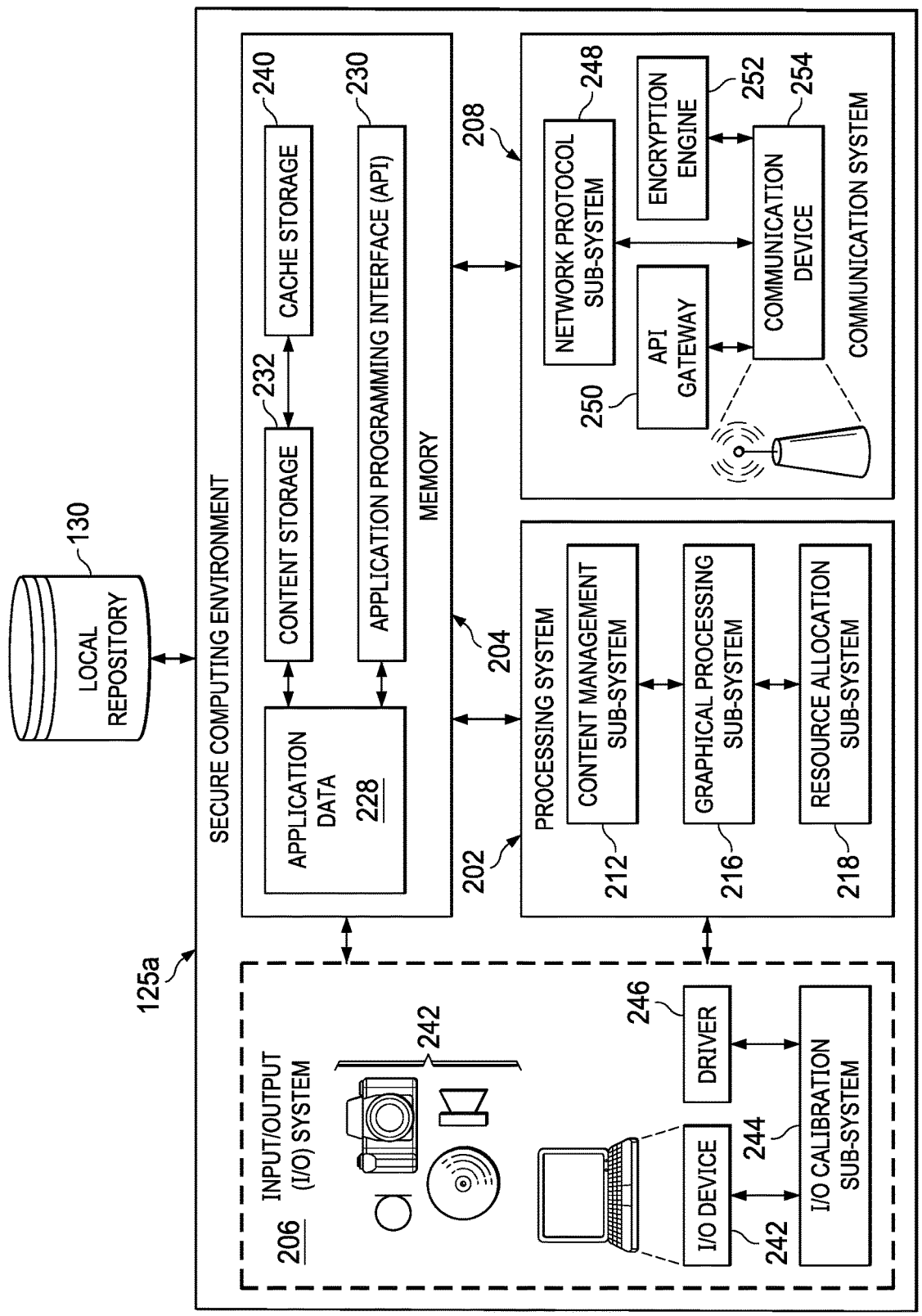
FIG. 2B is a detailed system diagram of FIG. 2A.

The processing system 202 may control the memory 204, the I/O system 206, and the communication system 208, as well as any included subsystems, elements, components, devices, and/or functions performed by the memory 204, I/O system 206, and the communication system 208. Additionally, any actions described in this disclosure as being performed by a processor or one or more processors of a computing device or one or more computing device processors and/or one or more computing system processors may be executed by the processing system 202 of FIGS. 2A and 2B. Further, while one processing system 202 is shown in FIGS. 2A and 2B, multiple processing systems may be present and/or otherwise included in the secure computing environment 125 or elsewhere in the overall network system 100 of FIG. 1. Thus, while instructions may be described as being executed by the processing system 202 (and/or various subsystems of the processing system 202), the instructions may be executed simultaneously, serially, and/or otherwise by one or multiple processing systems 202 on one or more computing devices.

According to one embodiment, the processing system 202 may be implemented as one or more computer processor chips and/or graphical processing unit (GPU) chips and may include a hardware device capable of executing computer instructions. The processing system 202 may execute instructions, codes, computer programs, and/or scripts. The instructions, codes, computer programs, and/or scripts may be received from the I/O system 206, the communication system 208, and/or stored in the memory 204, and/or received from the other subsystems of the secure computing environment 125 and/or received from other computing environments.

In some embodiments, the processing system 202 may include subsystems such as a content management subsystem 212, a graphical processing subsystem 216, and a resource allocation subsystem 218. Each of the aforementioned subsystems of the processing system 202 may be communicatively or operably coupled to each other.

The content management sub-system 212 may facilitate generation, modification, analysis, transmission, and/or presentation of content. Content may be file content, media content, structured data content, user interfaces, or any combination thereof. In some instances, content on which the content management system 212 operates includes structured data from the centralized repository 105, structured data from the local repository 130, user interface data, device information, images, text, themes, audio files, video files, documents, and/or the like. Additionally, the content management subsystem 212 may control the audio-visual environment and/or appearance of application data during execution of various processes. In some embodiments, the content management subsystem 212 may interface with a third-party content server and/or third-party memory locations for execution of its operations.

The graphical processing subsystem 216 may facilitate generation, modification, analysis, processing, transmission, and/or presentation of the content described above, as well as any data described herein. In some embodiments, the graphical processing subsystem 216 may be used to render content for presentation on a computing device (e.g., via a graphical user interface of the computing device). The graphical processing subsystem 216 may also include multiple graphical processing subsystems and therefore may be configured to perform and/or execute multiple processes in parallel. In some implementations, the graphical processing subsystem 216 may be used in conjunction with components of the memory 204, the I/O system 206, the communication system 208, and/or a combination thereof.

The resource allocation subsystem 218 may facilitate the determination, monitoring, analysis, and/or allocation of computing resources throughout the secure computing environment 125 and/or other computing environments. Computing resources of the secure computing environment 125 may be used by the processing system 202, the memory 204, the I/O system 206, and/or the communication system 208. These resources may include processing power, data storage space, network bandwidth, and/or the like. Accordingly, the resource allocation subsystem 218 may include sensors and/or other specially-purposed hardware for monitoring performance of each system and/or subsystem of the secure computing environment 125, as well as hardware for responding to the computing-resource needs of each system and/or subsystem. In some embodiments, the resource allocation subsystem 218 may use computing resources of a second secure computing environment separate and distinct from the secure computing environment 125 to facilitate a desired operation.

The memory 204 may be used for storing, recalling, receiving, transmitting, and/or accessing various files and/or data (e.g., structured data) during the operation of the secure computing environment 125. For example, the memory 204 may store, recall, and/or update structured data from the centralized repository and/or the local repository as the case may be. In some embodiments, the memory 204 may store instructions and/or data that may be executed by the processing system 202. For instance, the memory 204 may store instructions that execute operations associated with one or more systems and/or one or more subsystems of the secure computing environment 125. For example, the memory 204 may store instructions for the processing system 202, the I/O system 206, the communication system 208, and for itself.

Memory 204 may include various types of data storage media such as solid state storage media, hard disk storage media, virtual storage media, and/or the like. Memory 204 may include dedicated hardware elements such as hard drives and/or servers, as well as software elements such as cloud-based storage drives. In some implementations, memory 204 may be a random access memory (RAM) device, a dynamic random access memory (DRAM) device, a static random access memory (SRAM) device, flash memory, read only memory (ROM) device, and/or various forms of secondary storage. The RAM device may be used to store volatile data and/or to store instructions that may be executed by the processing system 202. For example, the instructions stored may be a command, a current operating state of secure computing environment 125, an intended operating state of secure computing environment 125, and/or the like. As a further example, data stored in the memory 204 may include instructions related to various methods and/or functionalities described herein. The ROM device may be a non-volatile memory device that may have a smaller memory capacity than the memory capacity of a secondary storage of the secure computing environment. The ROM device may be used to store instructions and/or data that may be read during execution of computer instructions. In some embodiments, access to both the RAM device and ROM device may be faster to access than access to the secondary storage of the secure computing environment 125. Secondary storage may comprise one or more disk drives and/or tape drives which may be used for non-volatile/non-transitory storage of data or as an over-flow data storage device of the secure computing environment 125 if the RAM device is not large enough to hold all working data. Secondary storage may be used to store programs that may be loaded into the RAM device when such programs are selected for execution.

Turning back to FIG. 2A, the memory 204 may include subsystems such as application data 228, application programming interface 230, content storage 232, and cache storage 240. Application data 228 may facilitate deployment, storage, access, execution, and/or utilization of an application utilized by the secure computing environment 125 and/or any other computing environments described herein. As such, application data 228 may store any information and/or data associated with an application. Application data 228 may further store various pieces of information and/or data associated with the operation of an application and/or with the secure computing environment 125 as a whole, such as a status of computing resources (e.g., processing power, memory availability, resource utilization, and/or the like), runtime information, user interfaces, systems to direct execution of operations described herein to, user permissions, security credentials, and/or the like.

The application programming interface (API) 230 may facilitate deployment, storage, access, execution, and/or utilization of information associated with APIs of secure computing environment 125 and/or any other computing environment described herein. For example, secure computing environment 125 may include one or more APIs for various devices, applications, systems, subsystems, elements, and/or other computing environments to allow communication between one or more applications associated with the secure computing environment 125. Accordingly, API 230 may include API databases containing information that may be accessed and/or used by applications, systems, subsystems, elements, and/or operating systems of other devices and/or computing environments in communication with the secure computing environment 125. In some cases, the API 230 may enable the centralized repository 105 and the secure computing environment 125 to communicate with each other.

The content storage 232 may facilitate deployment, storage, access, and/or utilization of information associated with structured data as further discussed below. In one embodiment, content storage 232 may communicate with a content management system 212 to receive and/or transmit content (e.g., structured data, media content, etc.).

The I/O system 206 may include hardware and/or software elements for the secure computing environment 125 to receive, and/or transmit, and/or present information useful for generating one or more interfaces for retrieving and displaying structured data according to some embodiments of this disclosure. For example, elements of the I/O system 206 may be used to receive input from a user of the secure computing environment 125. As described herein, I/O system 206 may include subsystems such as I/O device 242, I/O calibration subsystem 244, and/or driver 246.

The I/O device 242 may facilitate the receipt, transmission, processing, presentation, display, input, and/or output of information as a result of executed processes described herein. In some embodiments, the I/O device 242 may include a plurality of I/O devices. In some embodiments, I/O device 242 may include a variety of elements that enable a user to interface with secure computing environment 125. For example, I/O device 242 may include a keyboard, a touchscreen, a button, a sensor, a biometric scanner, a laser, a microphone, a camera, and/or another element for receiving and/or collecting input from a user. Additionally and/or alternatively, I/O device 242 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of processing system 202 and/or memory 204 to execute operations associated with generating user interfaces for retrieving and visualizing structured data.

The I/O calibration system 244 may facilitate the calibration of the I/O device 242. For example, I/O calibration system 244 may detect and/or determine one or more settings of I/O device 242, and then adjust and/or modify settings so that the I/O device 242 may operate more efficiently. In some embodiments, I/O calibration system 244 may use a driver 246 (or multiple drivers) to calibrate I/O device 242 as needed. For example, driver 246 may include software that is to be installed by I/O calibration system 244 so that an element of secure computing environment 125 (or an element of another computing environment) may recognize and/or integrate with I/O device 242.

The communication system 208 may facilitate establishment, maintenance, monitoring, and/or termination of communications between the secure computing environment 125 and other computing environments, third-party server systems, and/or the like. Communication system 208 may also facilitate internal communications between various elements (e.g., systems and/or subsystems) of secure computing environment 125. In some embodiments, communication system 208 may include a network protocol subsystem 248, an API gateway 250, an encryption engine 252, and/or a communication device 254. These systems and/or subsystems of the communication system 208 may be implemented as hardware, software, or a combination thereof.

The network protocol subsystem 248 may facilitate establishment, maintenance, and/or termination of a communication connection for the secure computing environment 125 via a network (e.g., network 110). For example, network protocol subsystem 248 may detect and/or define a communication protocol required by a particular network and/or network type. Communication protocols utilized by network protocol subsystem 248 may include Wi-Fi protocols, Li-Fi protocols, cellular data network protocols, Bluetooth® protocols, internet protocols, WiMAX protocols, Ethernet protocols, power line communication (PLC) protocols, and/or the like. In some embodiments, facilitation of communication for the secure computing environment 125 may include transforming and/or translating data from a first communication protocol to a second communication protocol. In some embodiments, network protocol subsystem 248 may determine and/or monitor an amount of data traffic to determine which network protocol is to be used for establishing a secure communication connection, transmitting data, and/or performing retrieval and subsequent visualization of structured data.

The application programming interface (API) gateway 250 may allow other devices and/or computing environments and/or applications external to the secure computing environment 125 to access the API 230 of the memory 204. For example, a computing system may access the API 230 of the secure computing environment 125 via the API gateway 250. In some embodiments, API gateway 250 may be required to validate user credentials associated with a user of a computing device (e.g., a device external to the secure computing environment 125) prior to providing access to the API 230 to the user. API gateway 250 may include instructions for the secure computing environment 125 and thereby communicate with external devices and/or between components of the secure computing environment 125.

The encryption engine 252 may facilitate translation, encryption, encoding, decryption, and/or decoding of information received, transmitted, and/or stored by the secure computing environment 125. Using encryption engine 252, each transmission of data may be encrypted, encoded, and/or translated for security reasons, and any received data may be encrypted, encoded, and/or translated prior to its processing and/or storage. In some embodiments, encryption engine 252 may generate an encryption key, an encoding key, a translation key, and/or the like, which may be transmitted along with any data content.

The communication device 254 may include a variety of hardware and/or software specifically purposed to facilitate communication for secure computing environment 125 with external systems and/or devices. In some embodiments, communication device 254 may include one or more radio transceivers, chips, analog front end (AFE) units, antennas, processing units, memory, other logic, and/or other components to implement communication protocols (wired or wireless) and related functionality for facilitating communication for WAS system 125. Additionally and/or alternatively, communication device 254 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

User Interfaces

Figure 3A:
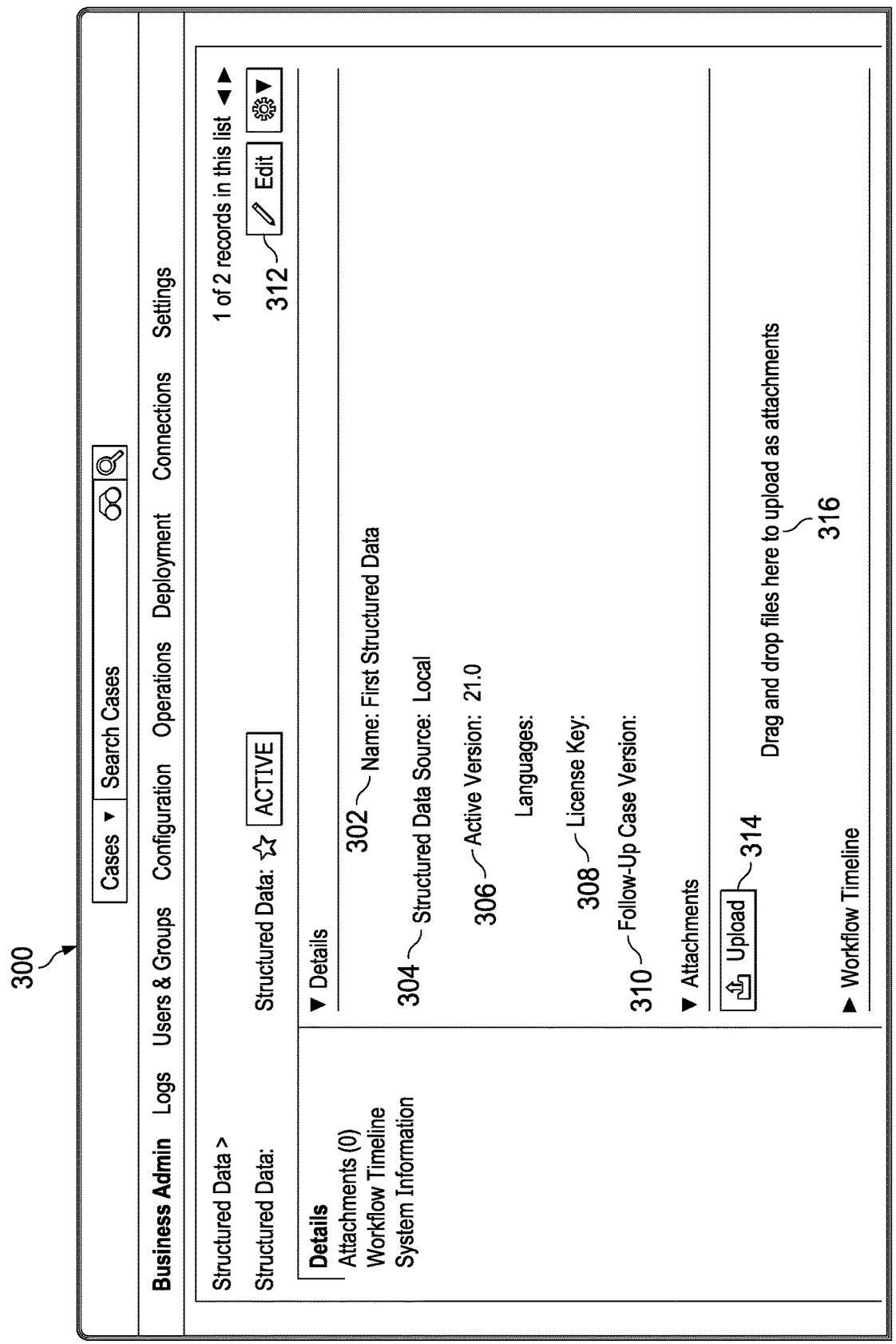
FIG. 3A shows an example user interface for accessing structured data, according to one embodiment.

FIG. 3A illustrates an example interface 300 that is generated within the secure computing environment 125. In one embodiment, the interface 300 is configured to access structured data within the centralized repository 105 and/or within the local repository 130. The interface 300 may include a browser interface having a plurality of fields and control buttons. For example, the interface 300 may include a name field 302 associated with the structured data, a source field 304 indicating whether the structured data is accessed from the centralized repository 105 or the local repository 130, a status field 306 associated with version information of the structured data, a license credential field 308 associated with license information of the structured data, and a version toggle field 310 configured to allow a user to either maintain a current version of the structured data or automatically adopt a new version of the structured data as the case may require for subsequent data operations. Also shown in FIG. 3A is an upload control button 314 which allows a user to manually upload structured data from third-party sources (e.g., parties whose structured data is external to the centralized repository 105). The user may also drag and drop the structured data from the third-party source into a drag-and-drop field 316. The interface 300 also includes an edit control button 312 that allows the user to change or otherwise manipulate information associated with the name field 302, the source field 304, the status field 306, the license credential field 308, and the version toggle field 310 as needed. In one embodiment, the interface 300 provides a user with a mechanism by which the user can easily enter relevant information into one or more of the aforementioned fields to gain access to structured data without having to deal with access issues such as latency, decoding, decryption and/or decompression of the structured data. Thus, the interface 300 effectively disengages the user from cumbersome access processes like decoding, decryption, decompression, update operations, as well as other latency issues associated with accessing the structured data.

Figure 3B:
FIG. 3B shows an example user interface that is generated to edit fields of the user interface of FIG. 3A.
Figure 3C:
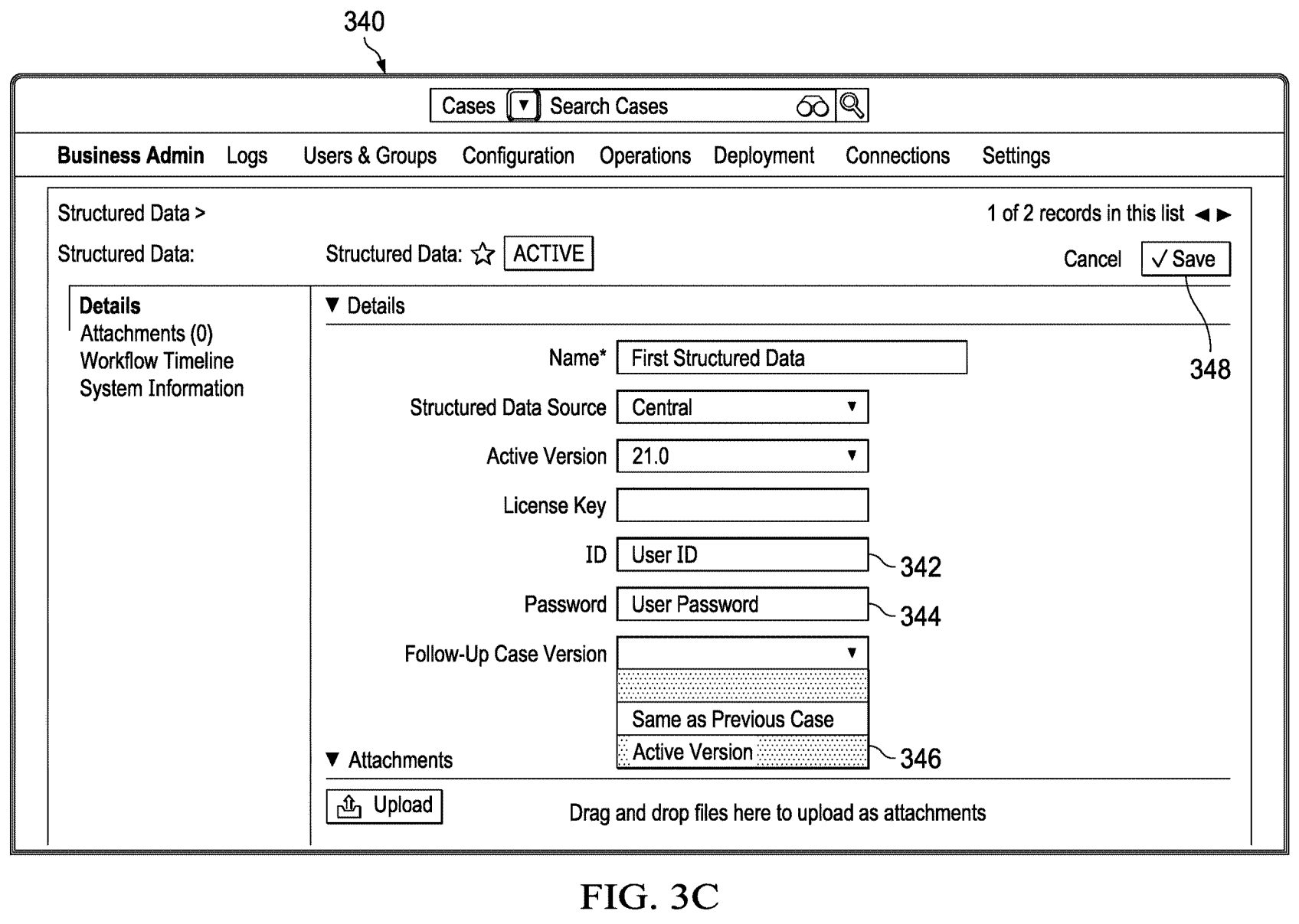

When the user activates (e.g., clicks) the edit control button 312 of FIG. 3A, the user interface 320 of FIG. 3B is generated. As previously discussed, the edit control button 312 allows the user to enter relevant information into the name field 302, the source field 304, the status field 306, the license credential field 308, and the version toggle field 310 as the case may require. For example, after the user activates the edit control button, the user may be able to select an option from the drop down menu 322 associated with the source field 304 of FIG. 3A. In the illustrated example, the user selects a "Local" option which means the structured data is being sourced or accessed from the local repository. Similarly, the user can select a "Central" option to access structured data from the centralized repository. For example, and as shown in the interface 340 of FIG. 3C, the user selects a "Central" option and enters credential information (e.g., user identifier (ID) 342 and a password 344) and selects an option from a menu 346 associated with version toggle 310. The user is then provided access to the structured data within the centralized repository. After the user enters the appropriate information associated with gaining access to the structured data, the user may activate (e.g., click) a save control button 348. According to one embodiment, the secure computing environment 125 may generate an interface such as the interface 360 shown in FIG. 3D after activating the save control button. According to one embodiment, the interface of FIG. 3D is similar to the interface of FIG. 3A. It should be noted that in FIG. 3D, the various fields of the interface are modified by the user (e.g., user selecting "Central" at the source filed 304).

Figure 3E:
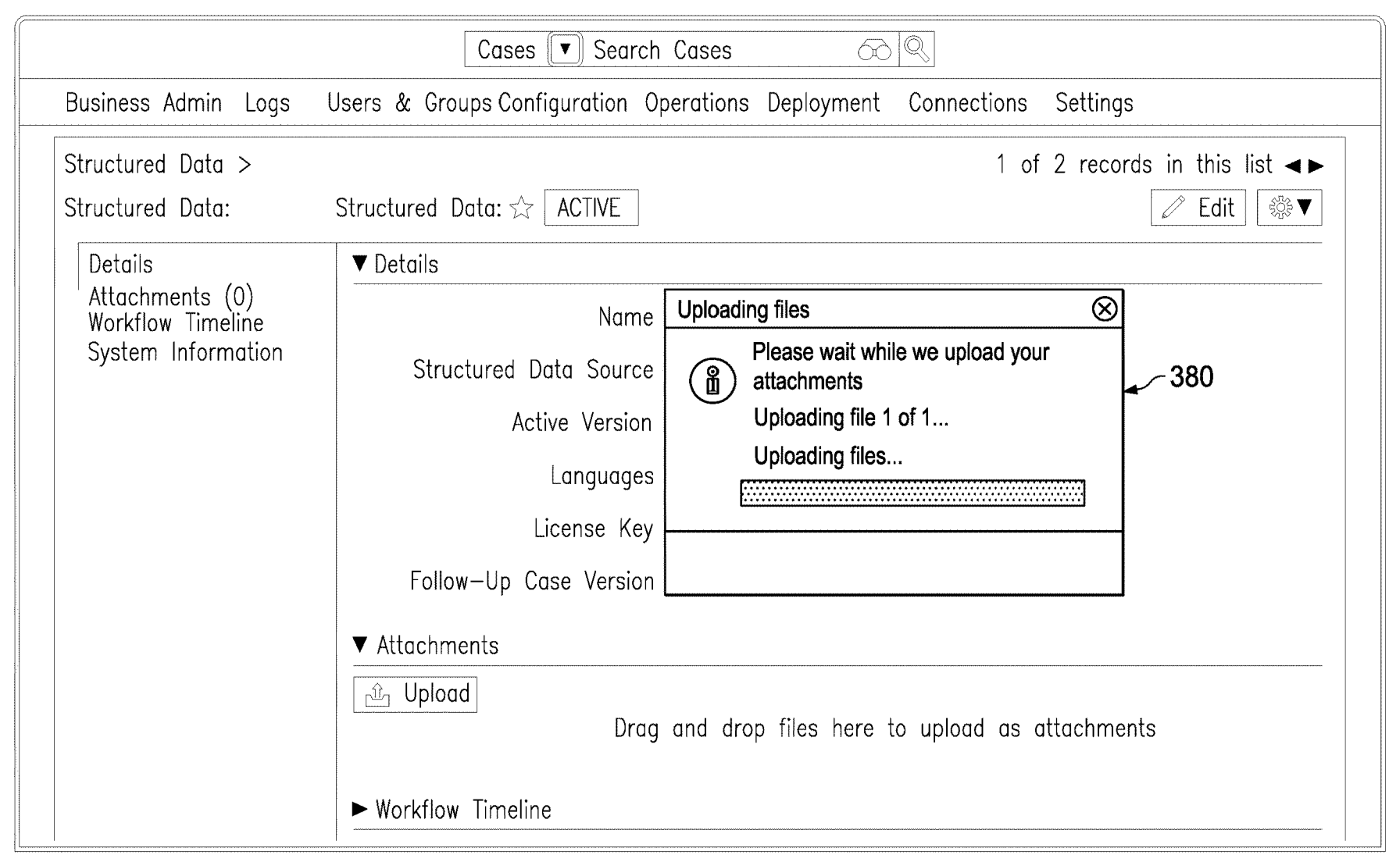

In FIG. 3E, the user manually uploads structured data from a source other than the centralized repository 105 and/or the local repository 130. As shown in the figure, a status window 380 may be generated responsive to manually uploading structured data using, for example, the upload control button 314 (see FIG. 3A) or the drag-and-drop field 316. The status window 380 provides an indication of the upload progress of a given structured data being uploaded.

In FIG. 3F, the user interface 390 is generated after a structured data is uploaded. In such cases, an indicator 392 may provide identifier information associated with the uploaded structured data.

Figure 4A:
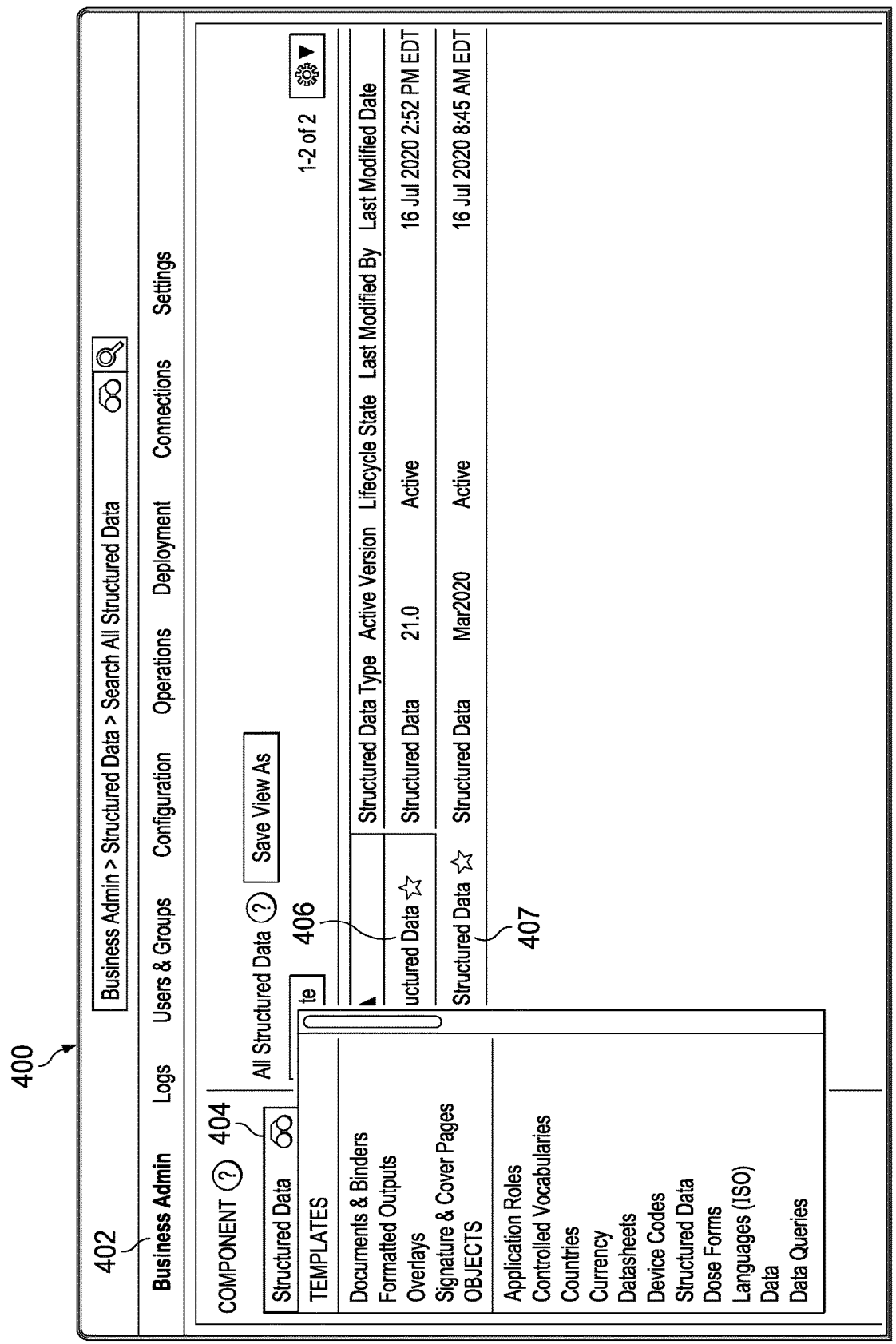

According to some implementations, the user may activate (e.g., click) data management control 402 to populate the interfaces 400/420 with relevant access fields such as structured data access field 404 shown in FIGS. 4A and 4B. For example, when the user enters "structured data" into the structured data access field 404, the populated interface 400 generates links 406 and 407 that respectively provide access to structured data associated with similar and/or dissimilar fields of endeavor. For example, the links 406 and 407 may be associated with structured medical terminology and structured biopharmaceutical terminology, respectively. Further, other identifying information associated with the links 406 and 407 may be provided within the interface 400 to indicate to the user, for example, what versions of the links are being displayed, whether the links have an active or inactive status, and when the links were last modified.

When the user provides an input associated with a first structured data into the structured data access field 404 of FIG. 4B, for example, the secure computing environment 420 may generate the interface 500 shown in FIG. 5. According to one embodiment, the interface 500 includes a plurality of lowest level terms 502 with associated identifiers 506 linked and/or comprised within the first structured data. In addition, the version 504 of the first structured data as well as other information such as language information, category information, etc., are provided in the interface 500 for each lowest level term 502. A user may access a plurality of lowest level terms associated the first structured data within the interface 500.

According to one implementation, a user may use lowest level terms 502 to more precisely describe a thing, an event, or a phenomenon. When the first structured data is updated, the lowest level terms 502 may also be accordingly updated. In some instances, updates to the first structured data results in new versions of the first structured data being created with corresponding updates to the lowest level terms. To prevent data corruption during an update in some embodiments, the secure computing environment 125 may update lowest level terms that would not be significantly impacted by the update before proceeding to lowest level terms that would. For terms that would be significantly altered by the update, the secure computing environment 125 may prompt the user to manually accept or reject such updates. If the user is using structured data that is sourced from the centralized repository 105, for example, the secure computing environment 125 would receive the latest version of the structured data. In particular, the centralized repository 105 is automatically updated once an update for the structured data is available.

Figure 6A:
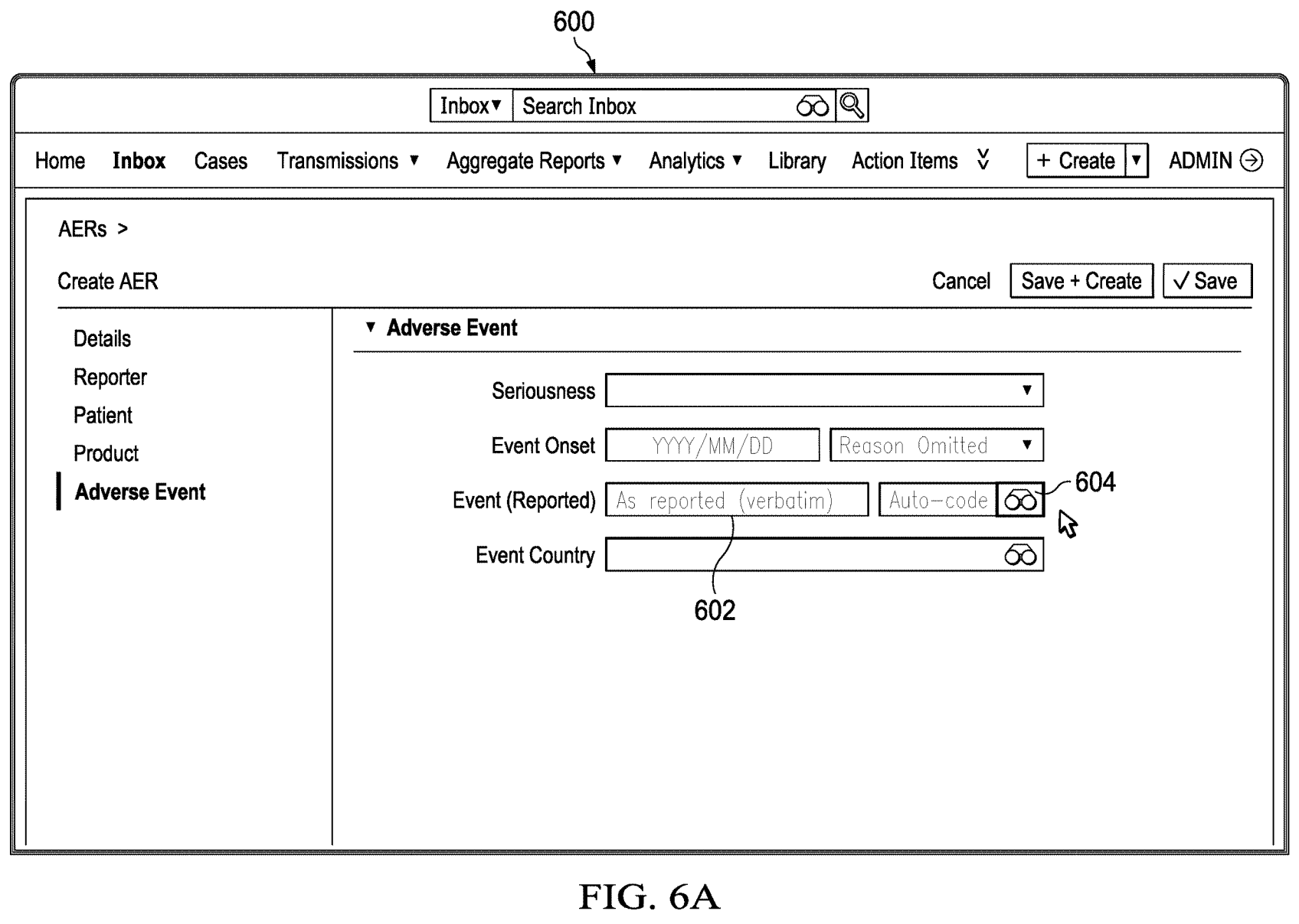
Figure 6B:
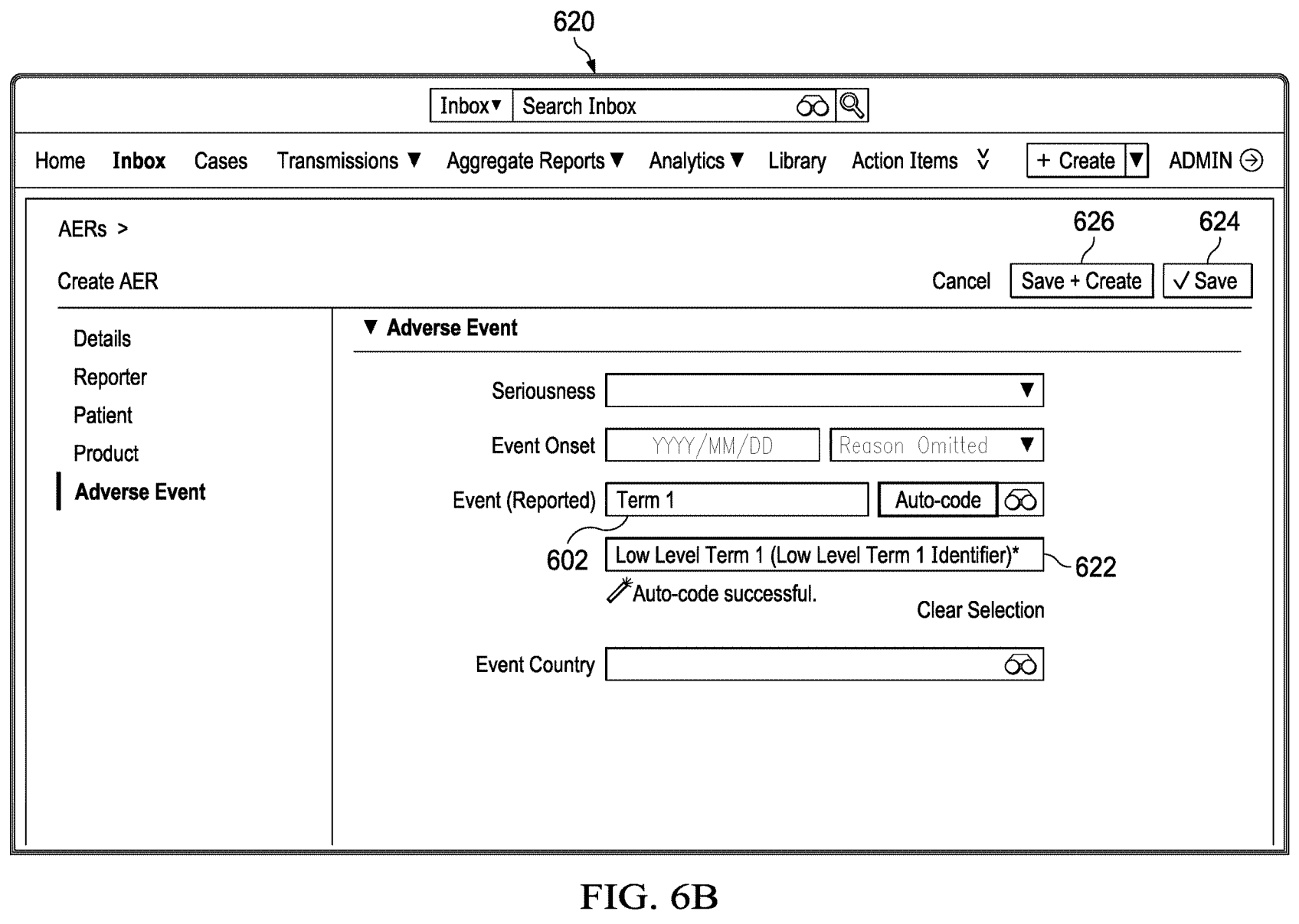

According to some embodiments, a user may use a lowest level term to prepare an event report as shown in FIG. 6A. In the user interface 600 of the figure, a user may identify and/or describe an event using a lowest level term such as lowest level term 502 of FIG. 5. In some cases, the user may update the lowest level term in a number of ways. For example, the user may input a word/term that is similar to the lowest level term into an automatic coding field 602 and then activate (e.g., click) an automatic coding button (e.g., "Auto-code" in FIG. 6A) that takes a snapshot/updates of the lowest level term from the centralized repository 105 and updates the same lowest level term in the local repository 130. According to one embodiment, automatic coding occurs at a record level such that the user merely activates a button on the interface 600 for the system 100 to assess one or more records (e.g., records including terms) in the local repository 130 that need to be updated to a specific version of associated records in the centralized repository 105. This beneficially updates records of the local repository that need to be updated without entirely updating all the records in the local repository 105 using, for example, a snapshot reference (e.g., a reference object including one or more identifiers, one or more tagging/coding data, and at least one version information). According to one embodiment, an automatic coding operation is executed using the tagging data responsive to activating an automatic coding button of the interface 600. For example, the user may select a search button 604 to manually identify a lowest level term in the local repository to be updated with changes from the centralized repository 105. In FIG. 6B, the user may enter a term into the automatic coding field 602 and then activates the automatic coding button to generate the lowest level term 622 which is coded to update, using a snapshot reference, the lowest level term 622 and then subsequently saved using the save button 624. The save and create button 626 enables further edits to a coded lowest level term. Turning to FIG. 6C, the user may activate the search button 604 (see FIG. 6B) which generates a search browser (see FIG. 7A) within which a lowest level term 622 may be searched and coded. Once the lowest level term 622 is identified from the search browser, the lowest level term is automatically coded to cause an update within the local repository 130. According to one embodiment, the update includes at least updating version information associated with a record/term within the local repository 130. In some cases, the update includes updating a plurality of records/terms within the local repository 130 based on updated records/terms within the centralized repository.

Figure 7A:
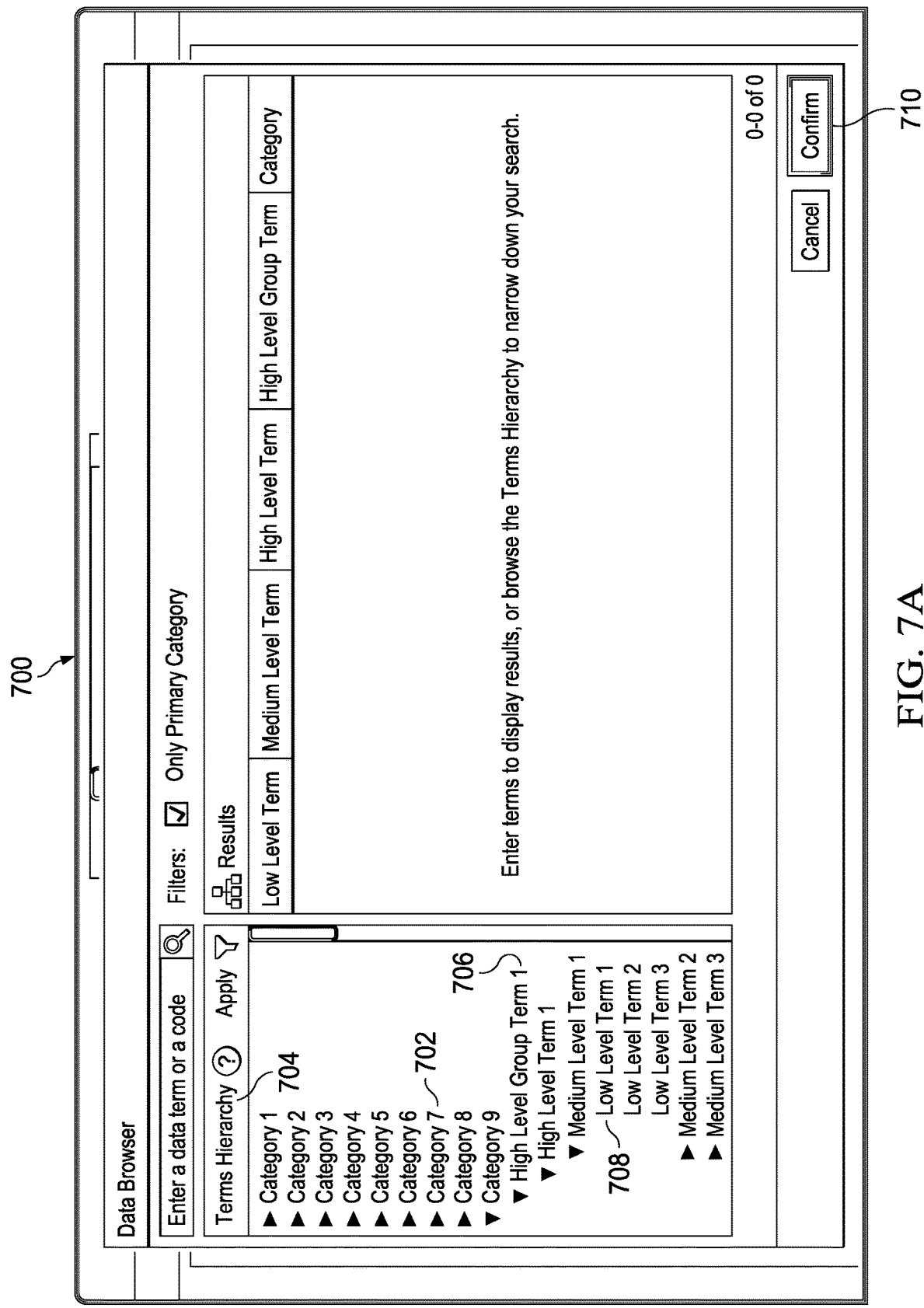

FIG. 7A shows an example search browser 700 that is generated responsive to activating the search button 604 (see FIG. 6B). According to some embodiments, the search browser 700 includes hierarchy menu 704 under which terms associated with a first structured data may be classified. For example, hierarchy menu 704 may include a category 702, a high level group term 706, and a low level group term 708. Once an element within the hierarchy menu 704 is selected, the user may actuate the confirm button 710 and return to the interface 640 of FIG. 6C. In FIG. 7B, the user many enter a low level term 1 into a search filed 722 to automatically generate the populated interface 720. As seen in the rows of the table 724, the structured data may be organized using low level terms that are a subset of medium level terms, which are in turn a subset of high level terms that fall under a high level term group. Such data hierarchies allow for easy tracking of terms and/or coding terms for generating event reports as discussed below. After the user selects an appropriate low level term, the user may activate the confirm button 726 in order to code the selected term to the local repository 130. It is appreciated that hierarchical structure discussed in association with FIG. 7A or 7B are analogous to the first structured data discussed in association with the flowchart of FIG. 8.

EXAMPLE

Tables 1-3 present various operations and steps that can be executed using one or more user interfaces of FIGS. 3A-7B and described elsewhere in this disclosure. It is appreciated that in this example, the structured data is a MedDRA dictionary

TABLE 1

| Key | Summary | Acceptance Criteria |
| --- | --- | --- |
| SAF-7630 | Show loading message when dictionary is in importing state | 1. When the lifecycle state on the MedDRA dictionary is Importing, the Active MedDRA Version app control shall display "MedDRA Dictionary is importing . . . " in view mode |
| SAF-7619 | Allow administrators to inactivate MedDRA Versions | 1. When the MedDRA or WHODrug dictionary releases are fetched, the picklist entries shall be saved as custom entries (e.g. _c) 2. An administrator user shall be able to set picklist entries of the MedDRA Versions picklist to inactive When inactive, MedDRA versions shall not be visible on Case > MedDRA Version picklist |
| SAF-7458 | E2B import if snapshot is not available use Central MedDRA | |
| SAF-7272 | Defaulting MedDRA Version on Study Cases | On the MedDRA dictionary screen, a new field is available Study Case MedDRA Version: Active MedDRA Version (default) Per Study Configuration When an AER is manually created (non-E2B scenario), When a Study (S) is selected, If (MedDRA).(Study Case MedDRA Version) = Study Configuration, (AER).(MedDRA Version) = (S).(MedDRA Version) Else if (MedDRA).(Study Case MedDRA Version) = Active MedDRA Version or blank, (AER).(MedDRA Version). (MedDRA).(Active MedDRA Version) When a follow-up study case is created (non-E2B scenario), Same logic as above |
| SAF-7057 | Defaulting MedDRA Version on Follow-Up Cases | Acceptance Criteria The MedDRA version of a manually created follow-up case will respect the new "Follow-Up Case MedDRA Version" field on the MedDRA Dictionary record. Specification On the MedDRA dictionary screen, a new field is available: Follow-Up Case MedDRA Version: Same as Previous Case (default) Active MedDRA Version When a follow-up case (C) is manually created (non-E2B scenario), If (MedDRA).(Follow-Up Case MedDRA Version) = Active MedDRA Version, (C).(MedDRA Version) = (MedDRA).(Active MedDRA Version) Else if (MedDRA).(Follow-Up Case MedDRA Version) = Same as Previous Case or blank Keep current deep-copy logic: (C).(MedDRA Version) = (C).(Previous Case).(MedDRA Version) |
| SAF-6736 | Support MedDRA Terms Hierarchy Search Filter on Central MedDRA (SAF-3677) | The MedDRA Terms Hierarchy Search filter shall continue to work as defined in SAF-3677 with central MedDRA enabled |
| SAF-6529 | Load SMQ Records from MedDRA Zip File | Extracting SMQs 1. If feature flag is enabled and dictionary source = central, an action to import SMQs shall be visible. Label = Import Standard MedDRA Queries 2. The most recent MedDRA zip file on the meddra dictionary record shall be loaded and extracted 3. Only the version of the MedDRA zip file corresponding to the current active version shall be allowed. An error notification shall be displayed with message: Please upload a MedDRA zip file with the same version as the current active MedDRA version 4. The extraction shall provision the SMQs from the dictionary, as well as its associated MedDRA terms only (i.e. do not load all the MedDRA terms in the MedDRA zip file |
| SAF-6529 | Load SMQ Records from MedDRA Zip File | Lifecycles and Notifications 1. When the job starts, the dictionary record lifecycle state shall be changed to importing. A notification shall be sent to the user. Title: Standard MedDRA Query Load Started Message: Starting to load Standard MedDRA Queries from MedDRA Dictionary <dictionary filename>. |

TABLE 1-continued

| Key | Summary | Acceptance Criteria |
|---|---|---|
| | | 2. On success, the dictionary record lifecycle state shall be changed to active a notification shall be sent to the user<br>Title: Standard MedDRA Query Load Succeeded<br>Message: Successfully loaded Standard MedDRA Queries from MedDRA Dictionary <dictionary filename>.<br>3. On failure, the dictionary lifecycle state shall change to Error a notification shall be sent to<br>the user<br>Title: Standard MedDRA Query Load Failed<br>Message: Failed to upload Standard MedDRA Queries from MedDRA Dictionary <dictionary<br>filename>. Reason: < reason><br>4. On failure, all records shall be rolled back (existing behavior)<br>Note: Keep existing MedDRA load functionality, but only load SMQs and their associated MedDRA terms |
| SAF-6526 | MedDRA Search Ordering | |
| SAF-6445 | Provision App Controls for MedDRA Fields without corresponding Event Reported | 1. For each of the fields in Table 2 below, a MedDRA Reference app control (MedDRA field without event reported) shall be provisioned<br><br>An upgrade task shall perform a one-time page layout update to replace the standard VOF object reference control with the app control, if the page layout exists<br>a. if page layout does not exist, skip updating the layout |
| SAF-6336 | Include MedDRA Dictionaries back to version: 19.1 in Central MedDRA | The central MedDRA dictionary shall make available the following MedDRA versions: 19.1, 20.0, 20.1, 21.0, 21.1, 22.0, 22.1, and 23.0 |
| SAF-5857 | Bulk Snapshot Existing MedDRA Terms to New Version on Active Meddra Change (MedDRA Compare & Impact Assessment Reports) | Snapshotting of Terms<br>1. When the dictionary source = central, the following applies:<br>2. When the active version is updated, an asynchronous operation to update MedDRA snapshot records (e.g. MedDRA terms coded in cases) shall be executed to enable running a compare and impact assessment report<br>3. Active version shall be set on MedDRA dictionary record when job completes successfully<br>a. Default version on case will be updated to this new active version (note: already done by trigger)<br>4. For all MedDRA entries in meddra___v,<br>if an exact match exists, add active_medra_version___v to meddra___v.meddra_version___v<br>--------------------------------------------------------<br>An exact match shall be defined as:<br>If all the following fields llt_code___v is not blank, match<br>llt_code___v<br>pt_code___v<br>hlt_code___v<br>hlgt_code___v<br>soc_code___v<br>to<br>central dictionary.llt_code<br>central dictionary.pt code<br>central dictionary.hlt code<br>central dictionary.hlgt code<br>central dictionary.soc code<br>If llt_code___v is blank, match<br>pt_code___v<br>hlt_code___v<br>hlgt_code___v<br>soc_code___v<br>to<br>central dictionary.pt code<br>central dictionary.hlt code<br>central dictionary.hlgt code<br>central dictionary.soc code |

TABLE 1-continued

| Key | Summary | Acceptance Criteria |
|---|---|---|
| | | Note: 1.<br>The above means that hierarchy records in the localized MedDRA table will not be updated (i.e. records at the SOC, HLGT and HLT levels)<br>------------------------------------------------------<br>Lifecycle and Notification<br>1. When the job starts, the dictionary record lifecycle state shall be changed to importing. A notification shall be sent to the user.<br>a. Title: MedDRA Version Update<br>b. Message: Updating the MedDRA Dictionary to version <version>.<br>2. On success, the dictionary record lifecycle state shall be changed to active a notification shall be sent to the user<br>3. On Success, the active version shall be set<br>a. Title: MedDRA Version Update<br>b. Message: Successfully updated the MedDRA Dictionary to version <version>.<br>4. On failure, the dictionary lifecycle state shall change to Error a notification shall be sent to the user<br>a. Title: MedDRA Version Update<br>b. Message: Cannot update the MedDRA Dictionary to version <version>. The system will continue to use the most recent active version (<previous version>). Reason: <reason><br>c. On failure, the MedDRA records shall be rolled back |
| SAF-5847 | Snapshot CMQ entries when coding | Snapshot CMQ Entries When Coding<br>1. Add MedDRA browser app control to the MedDRA Criteria object (meddra_criteria___v) to code the following 2 fields:<br>a. meddra___v<br>b. medical_condition___v<br>2. When the MedDRA term is selected, snapshot the term to meddra___v and save the reference to its corresponding field (refer to Table 3)<br>MedDRA Browser App Control UI<br>1. Zeplin (default control):<br>a. This app control will be used for MedDRA fields without Event Reported (specified in SAF-6455)<br>b. Placeholder message: 'Search MedDRA term . . . '<br>2. Scenario 1 (auto-code successful):<br>a. Prototype:<br>b. Clear the field box because there is no Reported value for these objects. The field box only serves as a shortcut search and validation method for MedDRA terms because only coded terms are acceptable<br>c. Below the field, display the coded LLT in a grey box and an auto-code success message<br>3. Scenario 2 (auto-code unsuccessful):<br>a. If the field entry does not auto-code successfully,<br>i. Display error message 'Not a valid MedDRA term' below the field<br>ii. Field borders turn red<br>iii. Error message will persist until a correct MedDRA is selected OR if the field is cleared<br>b. If user enters the MedDRA browser to select another term,<br>i. Retain their field entry in the search bar and auto initialize a search (e.g., auto-code might have been unsuccessful because there were multiple close results but no exact match)<br>ii. Prototype:<br>c. If user attempts to save without resolving the error,<br>i. Prevent page save when user clicks 'save'<br>ii. Display error message below the field: 'This value cannot be saved. Not a value MedDRA term.'<br>iii. Prototype:<br>d. To resolve the error, user must either:<br>i. Clear the field entry or<br>ii. Choose a valid MedDRA term through auto-code or browser |
| SAF-5845 | Snapshot existing SMQs/CMQs on MedDRA Version Change | Note: This JIRA assumes that SMQ (MedDRA query, MedDRA query criteria) objects have already been created. The scope of this JIRA is snapshotting updated MedDRA terms based on existing SMQ records (see SAF-6529)<br>1. When the active MedDRA version is changed, an asynchronous job shall run to snapshot MedDRA entries referred to by SMQs from the central MedDRA dictionary to the MedDRA snapshot object (meddra___v)<br>2. Perform a hierarchical query to retrieve MedDRA terms. For each MedDRA Query (meddra_query_v), iterate through its referenced MedDRA Criteria (meddra_criteria__v) and snapshot associated MedDRA terms<br>3. When the job starts, the dictionary record lifecycle state shall be changed to importing. A notification shall be sent to the user (tbd: message)<br>4. On success, the dictionary record lifecycle state shall be changed to active a notification shall be sent to the user (tbd: message) |

TABLE 1-continued

| Key | Summary | Acceptance Criteria |
|---|---|---|
| | | 5. On failure, the dictionary lifecycle state shall change to Error a notification shall be sent to the user (tbd: message) |
| SAF-5843 | MedDRA Version Selection and Licensing | Version Synchronization<br>1. A picklist app control shall be created to list available MedDRA dictionary versions (database: medical_dictionary, table: dictionary_releases). Filter by entries of dictionary_type = MedDRA<br>2. The control shall display a message if the available MedDRA dictionary releases on the POD is not in sync with the currently picklist of available MedDRA versions (The list of available MedDRA versions is out of sync with the server. Please sync the MedDRA versions to update the list.)<br>3. If out of sync, an action will become available in the gear menu for the user to sync the missing MedDRA versions to the current picklist. Label = Fetch Dictionary Releases<br>4. Picklist shall always include the default version -<br>5. The picklist label shall be in the form of major.minor. - e.g., 20.1<br>Note: MedDRA release versions in the central db have the form such as:<br>MedDRA_20_0<br>MedDRA_20_1<br>MedDRA_21_0<br>MedDRA_21_1<br>MedDRA_22_0<br>MedDRA_22_1<br>MedDRA_23_0<br>e.g.<br>MedDRA_major_minor.<br>Hence the release name will have to be transformed to the above format<br>6. Picklist will be ordered in descending order by version number (e.g. 21.0, 20.1)<br>--------------------------------------------------<br>Licensing<br>1. The system shall enforce the user entering their MedDRA ID and password<br>2. New fields on dictionary_v, only enabled on type meddra_dictionary_v<br>a. Label: MedDRA ID name: meddra_id___v type: text max length: 20<br>b. Label: MedDRA Password name: meddra_password___v type: text PHI protection = on (this will encrypt the password so cannot be viewed by other users).<br>3. If id and password are not entered and dictionary source = central, the user shall receive an error message on saving the record displayed in a pop-up (message: Please enter a MedDRA ID and MedDRA Password)<br>--------------------------------------------------<br>Dictionary Source<br>1. Picklist to select dictionary source<br>2. Options: local, central<br>--------------------------------------------------<br>Legacy Import MedDRA Action<br>1. Import MedDRA action shall only be visible when the feature flag is disabled and dictionary source = local<br>--------------------------------------------------<br>Fetch WHODrug Releases Action<br>1. Fetch WHODrug Releases action label shall be changed to Fetch Dictionary Releases |
| SAF-5842 | Auto-code using Central MedDRA from E2B Import | 1. On E2B Import, auto-coding shall be performed with the central dictionary<br>2. The feature shall continue to work as defined in SAF-2133 |
| SAF-5839 | Central MedDRA for Single Search and Autocode from UI | 1. When central MedDRA feature flag (meddra_centralized___v) is enabled the central MedDRA dictionary shall be used to search MedDRA (see SAF-5843)<br>2. The MedDRA version in case_version_v.meddra_version_v field shall be used to select MedDRA version (implementation note: we will use the picklist value (e.g. 21.0) to construct the MedDRA dictionary release name (21.0 -> MedDRA_21_0)<br>3. When the MedDRA search is executed, the MedDRA record will be snapshot into meddra___v<br>hlgt_term___v<br>hlgt_code___v<br>hlt_term___v<br>hlt_code___v<br>language___v<br>llt_term___v<br>llt_code___v<br>meddra_version___v<br>primary_soc___v |

TABLE 1-continued

| Key | Summary | Acceptance Criteria |
|---|---|---|
| | | pt_term___v<br>pt___v<br>soc_term___v<br>soc_code___v<br>4. If the entry already exists, but the version is different, the current active version will be appended to meddra_version_v on meddra_v<br>5. It will also snapshot llt_term_v and llt_code_v even when pt code = llt code |

TABLE 2

| Object | Field Label | Field Name | Page Layout(s) |
|---|---|---|---|
| Case Adverse Event | Event (LLT) | event_meddra___v | case_adverse_event_detail_page_layout___c |
| Case Assessment | Event (LLT) - MedDRA | case_adverse_event_meddra___v | case_assessment_detail_page_layout___c |
| Case Cause of Death | Cause of Death (LLT) | name_meddra___v | autopsy_cause_of_death_page_layout___c<br>case_cause_of_death_detail_page_layout___c<br>case_cause_of_death_detail_page_layout___c |
| Case Drug History | Indication (LLT) | reaction_meddra___v | case_drug_history_detail_page_layout___c |
| Case Drug History | Reaction (LLT) | | |
| Case Medical History | Condition (MedDRA) | name_meddra___v | case_medical_history_detail_page_layout___c |
| Case Product Indication | Name (MedDRA) | name_meddra___v | case_product_indication_detail_page_layo___c |
| Case Test Result | Test Name (LLT) | name_meddra___v | case_test_result_detail_page_layout___c |
| Case | Event (MedDRA) | event_meddra___v | aer_detail_page_layout___c |
| Case Diagnosis | Name (MedDRA) | name_meddra___v | case_diagnosis_detail_page_layout___c |
| MedDRA Criteria | MedDRA Term | meddra___v | meddra_criteria_detail_page_layout___c |
| MedDRA Criteria | Medical Condition | medical_condition___v | meddra_criteria_detail_page_layout___c |
| Study Arm | Indication | indication_meddra___v | study_arm_detail_page_layout___c |
| Study Indication | Indication | indication_meddra___v | study_indication___v |

Note:
Should be two separate upgrade tasks to simplify re-running and dealing with edge cases

TABLE 3

| Label | Help Text | Description |
|---|---|---|
| MedDRA Criteria | Enter the criteria MedDRA term using the Auto-code button or the MedDRA browser. | This control is used to access the MedDRA Browser and Auto-code functionality in place of the meddra___v field. |
| MedDRA Condition | Enter the condition MedDRA term using the Auto-code button or the MedDRA browser. | This control is used to access the MedDRA Browser and Auto-code functionality in place of the medical_condition___v field. |

In order to implement all or aspects of the above table descriptions, a point of delivery (POD) level may deploy scripts to import a MedDRA dictionary to the centralized repository. A new database is created if one does not already exist based on the scripts. Also, medical dictionary tables may be created by importing a MedDRA directory record to a new table based on language or on version. In some cases, a dictionary released table may be generated to store the information related to the MedDRA tables available within the centralized repository. At the secure computing environment, a user may access the centralized repository storing the MedDRA dictionary and/or the MedDRA tables via a first API that requests all released versions of the MedDRA in a specific language. The user may also receive a specific version of the MedDRA dictionary and/or MedDRA table in a specific language.

While creating any safety records, the secure computing environment and/or the centralized repository may identify a MedDRA record by querying the centralized repository. A snapshot of an instance of all or aspects of the centralized repository is then created. This snapshot may be referenced from one or more safety records. Objects associated with the snapshot may be used to store snapshots that are taken. This beneficially allows the system to avoid data migration which undesirably has associated bandwidth and latency issues.

Furthermore, a user may initiate an auto-coding of a phenomenon/event via one or more of the user interfaces described above by enabling or providing an input via the user interface enabling the use of the centralized repository (e.g., see FIGS. 3A-3B). The centralized repository is then queried to select a record. Once the record is selected, a check operation is executed to determine whether a snapshot of the repository is available to see if the record already exists in the local repository. If the record is present in the local repository, a snapshot reference is sent to the local repository. If a snapshot is not present in the local repository a snapshot of the centralized repository is created. A snapshot reference is then sent to the local repository to reference the parent record.

According to some implementations, auto-coding processes of an event or phenomenon may be executed during child record creations. In such instances, a snapshot query may be executed on the local repository to determine if a particular record exists. If the record exists on a local snapshot dictionary, a matching MedDRA term and/or MedDRA version is retrieved and used. Otherwise a feature flag is enabled via the user interface (e.g., FIGS. 3A-3B) to use the centralized repository's version of the MedDRA. The centralized repository is then queried to find a particular record that matches the search criteria of the query. A snapshot of the MedDRA within the centralized repository is then checked against the local snapshot dictionary. If the record in question is present based on the check, a snapshot reference is sent to the local repository. If a snapshot is not present in the local repository a snapshot of the centralized repository is created. A snapshot reference is then sent to the local repository to reference the parent record.

Workflow

Figure 8:
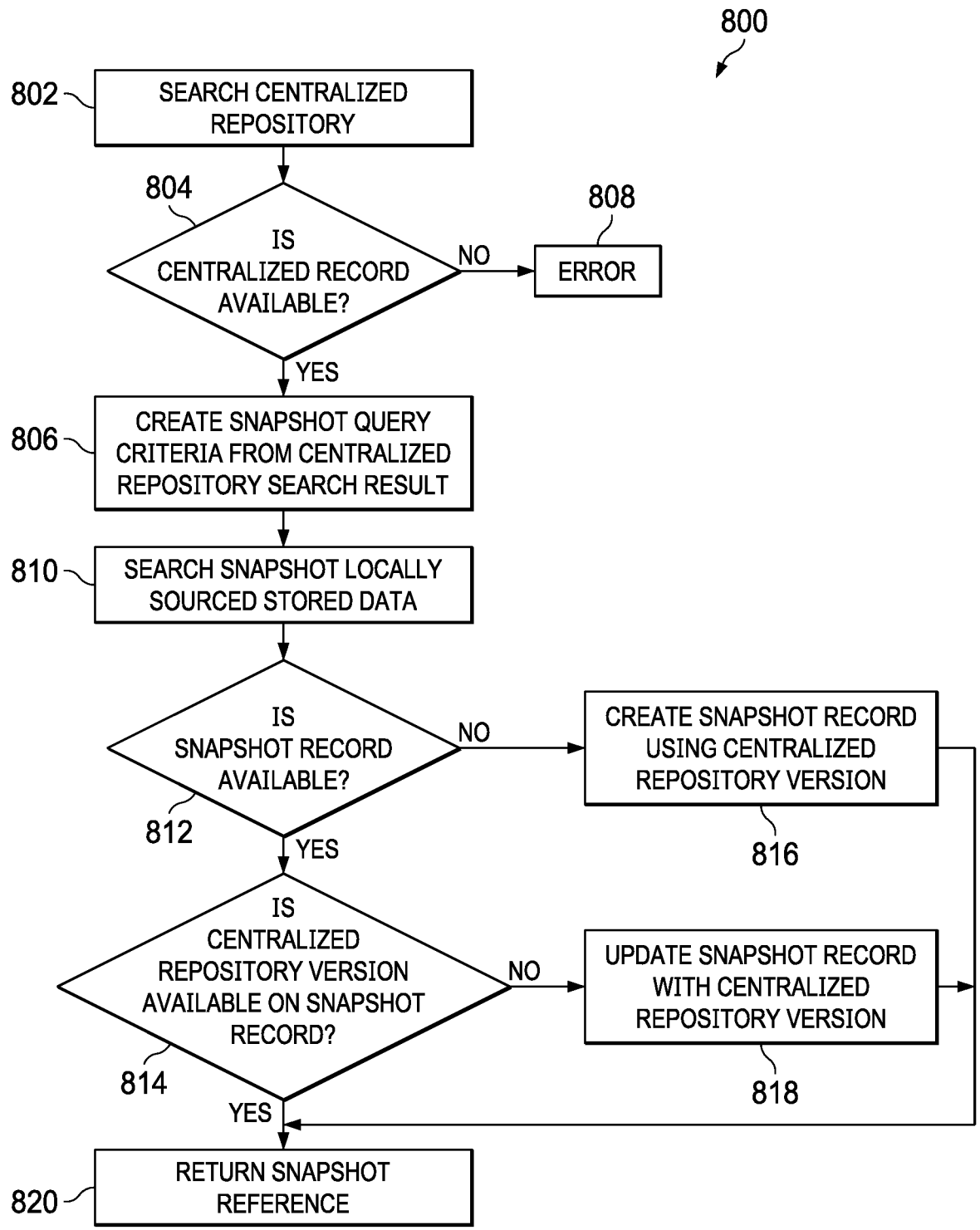
FIG. 8 shows an example flowchart for accessing structured data, according to one embodiment.

FIG. 8 shows an example flowchart for accessing structured data. At block 802, the centralized repository 105 may receive a first request for a first structured data. The first structured data may include a plurality of hierarchical records such that each hierarchical record includes a first first-level field entry, a first second-level field entry, a first third-level field entry, and a first category field entry. According to some implementations, the first request may be delivered/transmitted via a user interface configured to receive one or more inputs from a user. The user interface (e.g., user interfaces shown in FIGS. 3B-3C) may be displayable to the user using, for example, the secure computing environment 125. In addition, the first request may include credential information of the user/credential information associated with the structured data, version information associated with the structured data, terms associated with the structured data, etc. At block 804, the centralized repository 105, and/or the secure computing environment 125 searches the centralized repository 105 to determine whether the first structured data is available for access. If the structured data is unavailable, an error message is generated at block 808. If the first structured data is available, the centralized repository 105 creates, at block 806, a snapshot query criterion/criteria (i.e., criteria to query the snapshot). The snapshot query criteria may allow the centralized repository 105 to search/determine, at block 810, a snapshot of the first structured data. At block 812, the centralized repository 105 may determine if a snapshot of the first structured data is available. According to some implementations, a snapshot of the first structured data includes a copy of all of the requested structured data, or portions of the requested structured data, or a specific version of the requested structured data, or portions of the specific version of the structured data. In some cases, the snapshot is based on components of the first request such as version information, term information, etc.

If the snapshot of the first structured data is not available, the centralized repository 105 may generate a snapshot of the first structured data at block 816 and transmit, at block 820, a snapshot reference to secure computing environment 125. In some cases, the snapshot reference includes a reference object that references one or more records/terms from the centralized repository 105 to the local repository 130. In some embodiments the snapshot reference includes metadata of the structured data within the centralized repository such as identifiers, tagging/coding data, and version information associated with the first structured data.

If the snapshot of the first structured data (e.g., one or more hierarchical records) is available, the centralized repository determines, at block 814, whether the version of the structured data within the snapshot is consistent with the version information in the first request. If the version information is consistent with the version of the first structured data within the snapshot, the centralized repository 105 transmits, at block 820, the snapshot reference to the centralized computing environment 125. If the version of the first structured data within/associated with the snapshot does not match with the version information within the first request, the centralized repository 105 updates the snapshot of the first structured data to be consistent with the version information within the first request before transmitting the snapshot reference. According to one embodiment, the snapshot reference includes a reference/pointer object having identifier information, coding or tagging information, and version information associated with one or more records within the centralized repository 105. In some implementations, the snapshot references comprises a pointer object that points to information stored in the centralized repository such that when a record in the local and/or centralized repository is modified, the pointer object remains the same. For historical purposes, the snapshot reference, according to some embodiments, can point to a specific version of information (e.g., record comprised in a structured data).

Prior to transmitting the snapshot reference, according to some embodiments, the centralized repository 105 may search using the snapshot query criterion, a second repository (e.g., local repository 130) comprising a first snapshot of the first structured data to determine that a second hierarchical record comprised in the first snapshot at least partially matches the first hierarchical record comprised in the first structured data. The second hierarchical record may include a second first-level field entry, a second second-level field entry, a second third-level field entry, and a second category field entry, comprised in the first snapshot. In some cases, the centralized repository 105 may determine whether version information associated with the first snapshot of the first structured data is available and adds the available version information to the second hierarchical record. If the centralized repository 105 determines that the second hierarchical record does not at least partially match the first hierarchical record, the system 100 creates and/or adds version information to a third hierarchical record comprised in the local repository 105 that matches the first hierarchical record.

The snapshot reference beneficially allows the secure computing environment 125 to update, in some implementations, portions of the first structured data (e.g., one or more hierarchical record) within the local repository 130 without the computational overhead of transmitting the entire first structured data to the local repository 130. According to some implementations, the secure computing environment 125 may use the snapshot reference to store all or portions of the requested structured data in the local repository 130. For example, the snapshot reference may facilitate updates of one or more records in the local repository through an automatic coding process. According to some embodiments, a first snapshot reference may be locally stored within the local repository 130 and may then be subsequently compared to a second snapshot from the centralized repository 105 in order to effect one or more updates to a plurality of records or terms associated with structured data within the local repository 130. In some instances, a snapshot reference stored in the local repository 130 may be used to update one or more local records without using a snapshot reference stored in the centralized repository 105. In embodiments, a plurality of snapshot references may be stored in the local and/or centralized repositories in a reference library and point to one or more structured data within the local and centralized repositories as the case may require. In some cases, the secure computing environment may display, via one or more interfaces, structured data based on the received snapshot reference.

In some embodiments, a method comprises: receiving, using one or more computing device processors, from a requesting computing device, a first request for a first hierarchical record associated with first version information, wherein the first hierarchical record comprises a first first-level field entry, a first second-level field entry, a first third-level field entry, and a first category field entry; searching, using the one or more computing device processors, a first repository, comprising first structured data, for the first hierarchical record; determining, using the one or more computing device processors, whether the first hierarchical record is present in the first structured data comprised in the first repository; in response to determining the first hierarchical record is present in the first structured data comprised in the first repository, creating, using the one or more computing device processors, based on the first hierarchical record in the first structured data, a snapshot query criterion; searching, using the one or more computing device processors, based on the snapshot query criterion, a second repository comprising a first snapshot of the first structured data; determining, using the one or more computing device processors, whether a second hierarchical record, comprising a second first-level field entry, a second second-level field entry, a second third-level field entry, and a second category field entry, comprised in the first snapshot of the first structured data at least partially matches the first hierarchical record comprised in the first structured data; in response to determining that the first hierarchical record at least partially matches the second hierarchical record, determining, using the one or more computing device processors, whether second version information associated with the first snapshot of the first structured data is available; and in response to determining the second version information associated with the first snapshot of the first structured data is available, transmitting, using the one or more computing device processors, to the requesting computing device, a reference pointer associated with the second hierarchical record comprised in the first snapshot of the first structured data comprised in the second repository.

In some cases, the transmitting associated with the disclosed method is executed further based on determining the second version information associated with the first snapshot of the first structured data substantially matches the first version information. Moreover, the reference pointer discussed above and associated with the second hierarchical record remains static when modifying information comprised in the second hierarchical record.

According to some embodiments, determining the first hierarchical record at least partially matches the second hierarchical record comprises at least partially matching the first first-level field entry, the first second-level field entry, the first third-level field entry, and the first category field entry with the second first-level field entry, the second second-level field entry, the second third-level field entry, and the second category field entry, respectively. In one embodiment, determining the first hierarchical record at least partially matches the second hierarchical record comprises at least partially matching the first second-level field entry, the first third-level field entry, and the first category field entry to the second second-level field entry, the second third-level field entry, and the second category field entry, respectively. It is appreciated that the first structured data comprises a Medical Dictionary for Regulatory Activities (MedDRA) dictionary.

In some embodiments, a method is provided that comprises: receiving, using one or more computing device processors, from a requesting computing device, a first request for a first hierarchical record, wherein the first hierarchical record comprises a first first-level field entry, a first second-level field entry, a first third-level field entry, and a first category field entry; searching, using the one or more computing device processors, a first repository, comprising first structured data, for the first hierarchical record; determining, using the one or more computing device processors, whether the first hierarchical record is present in the first structured data comprised in the first repository; in response to determining the first hierarchical record is present in the first structured data comprised in the first repository, creating, using the one or more computing device processors, based on the first hierarchical record in the first structured data, a snapshot query criterion; searching, using the one or more computing device processors, based on the snapshot query criterion, a second repository comprising a first snapshot of the first structured data; determining, using the one or more computing device processors, whether a second hierarchical record, comprising a second first-level field entry, a second second-level field entry, a second third-level field entry, and a second category field entry, comprised in the first snapshot of the first structured data at least partially matches the first hierarchical record comprised in the first structured data; in response to determining that the first record at least partially matches the second hierarchical record, determining, using the one or more computing device processors, whether first version information associated with the first snapshot of the first structured data is available; in response to determining the first version information associated with the first snapshot of the first structured data is not available, adding, using the one or more computing device processors, second version information associated with the first structured data to the second hierarchical record comprised in the second repository; and transmitting, using the one or more computing device processors, to the requesting computing device, information associated with the second hierarchical record.

The first request for the first hierarchical record may include credential information and the first request may be transmitted via a user interface comprising at least one field configured to receive the second version information associated with the first structured data. The information associated with the second hierarchical record may comprise a snapshot reference, wherein the snapshot reference associated with the second hierarchical record is not modified before and after adding the second version information associated with the first structured data to the second hierarchical record. In some cases, the information associated with the second hierarchical record comprises a snapshot reference associated with the second hierarchical record.

In some embodiments, a method associated with one or more figures disclosed herein comprises: receiving, using one or more computing device processors, from a requesting computing device, a first request for a first hierarchical record, wherein the first hierarchical record comprises a first first-level field entry, a first second-level field entry, a first third-level field entry, and a first category field entry; searching, using the one or more computing device processors, a first repository, comprising first structured data, for the first hierarchical record; determining, using the one or more computing device processors, whether the first hierarchical record is present in the first structured data comprised in the first repository; in response to determining the first hierarchical record is present in the first structured data comprised in the first repository, creating, using the one or more computing device processors, based on the first hierarchical record in the first structured data, a snapshot query criterion; searching, using the one or more computing device processors, based on the snapshot query criterion, a second repository comprising a first snapshot of the first structured data; determining, using the one or more computing device processors, whether a second hierarchical record, comprising a second first-level field entry, a second second-level field entry, a second third-level field entry, and a second category field entry, comprised in the first snapshot of the first structured data at least partially matches the first hierarchical record comprised in the first structured data; in response to determining that the first hierarchical record does not at least partially match the second hierarchical record, creating, using the one or more computing device processors, a third hierarchical record, matching the first hierarchical record, in the second repository, wherein the creating comprises adding, using the one or more computing device processors, version information associated with the first structured data to the third hierarchical record comprised in the second repository; transmitting, using the one or more computing device processors, to the requesting computing device, reference information associated with the third hierarchical record, wherein the reference information either points to or is used to locate the third hierarchical record.

The first request may be transmitted via a user interface comprising at least one field configured to receive credential information associated with the first structured data. The method may comprise providing a tagging interface for updating second version information associated with the second hierarchical record.

In some embodiments, a system associated with one or more figures disclosed herein comprises: one or more computing system processors and at least one memory storing instructions, that when executed by the one or more computing system processors cause the one or more computing system processors to: receive from a requesting computing device, a first request for a first hierarchical record, wherein the first hierarchical record comprises a first first-level field entry, a first second-level field entry, a first third-level field entry, and a first category field entry; search a first repository, comprising first structured data, for the first hierarchical record; determine whether the first hierarchical record is present in the first structured data comprised in the first repository; in response to determining the first hierarchical record is present in the first structured data comprised in the first repository, create, based on the first hierarchical record in the first structured data, a snapshot query criterion; search, based on the snapshot query criterion, a second repository comprising a first snapshot of the first structured data; determine whether a second hierarchical record, comprising a second first-level field entry, a second second-level field entry, a second third-level field entry, and a second category field entry, comprised in the first snapshot of the first structured data at least partially matches the first hierarchical record comprised in the first structured data; in response to determining that the first hierarchical record at least partially matches the second hierarchical record, determine whether version information associated with the first snapshot of the first structured data is available; and in response to determining the version information associated with the first snapshot of the first structured data is available, transmit, to the requesting computing device, a snapshot reference to the second hierarchical record comprised in the second repository.

The first repository may require authentication before access is granted to the first structured data. The first repository may store at least two versions of the first structured data. The first structured data may comprise data associated with a Medical Dictionary for Regulatory Activities (MedDRA) dictionary. The one or more computing device processors may be further configured to execute a coding operation, initiated using a single user or automatic initiation operation, to update, delete, or add record-specific information associated with multiple hierarchical records comprised in the second repository. The one or more computing device processors may be further configured to execute a coding operation to update second version information associated with the second hierarchical record comprised in the second repository.

The foregoing description of the implementations of the present disclosure has been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. Accordingly, the disclosure of the present disclosure is intended to be illustrative, but not limiting, of the scope of the present disclosure, which is set forth in the following claims.

The invention claimed is:

1. A method comprising:
  receiving, using one or more computing device processors, from a requesting computing device, a first request for a first record with at least one field entry, wherein the first record with the at least one field entry comprises at least one of a first first-level field entry, a first second-level field entry, a first third-level field entry, or a first category field entry;
  searching, using the one or more computing device processors, a first repository, comprising first structured or unstructured data, for the first record with the at least one field entry;
  determining, using the one or more computing device processors, whether the first record with the at least one field entry is present in the first structured or unstructured data comprised in the first repository;
  in response to determining the first record with the at least one field entry is present in the first structured or unstructured data comprised in the first repository, creating, using the one or more computing device processors, based on the first record with the at least one field entry in the first structured or unstructured data, a snapshot query criterion;
  searching, using the one or more computing device processors, based on the snapshot query criterion, a second repository comprising a first snapshot of the first structured or unstructured data;

determining, using the one or more computing device processors, whether a second record with at least one second field entry, comprising at least one of a second first-level field entry, a second second-level field entry, a second third-level field entry, or a second category field entry, comprised in the first snapshot of the first structured or unstructured data at least partially matches the first record with the at least one field entry comprised in the first structured or unstructured data; and executing at least one of a data compression operation, a data decryption operation, or a data decoding operation associated with the first structured or unstructured data, wherein the at least one of the data compression operation, the data encryption operation, or the data decoding operation is isolated from the requesting computing device.

2. The method of claim 1, wherein in response to determining that the first record with the at least one field entry at least partially matches the second record with the at least one second field entry, determining, using the one or more computing device processors, whether version information associated with the first snapshot of the first structured or unstructured data is available.

3. The method of claim 2, wherein in response to determining the version information associated with the first snapshot of the first structured or unstructured data is available, transmitting, using the one or more computing device processors, to the requesting computing device, a reference pointer associated with the second record with the at least one second field entry comprised in the first snapshot comprised in the second repository.

4. The method of claim 1, wherein determining the first record at least partially matches the second record comprises comparing at least one of the first second-level field entry, the first third-level field entry, and the first category field entry to at least one of the second second-level field entry, the second third-level field entry, and the second category field entry, respectively.

5. The method of claim 1, wherein the executing the at least one of the data compression operation, the data decryption operation, or the data decoding operation associated with the first structured or unstructured data occurs in response to at least one of the first repository receiving, transmitting, or storing information.

6. A method comprising:
receiving, using one or more computing device processors, from a requesting computing device, a first request for a first record with at least one field entry, wherein the first record with the at least one field entry comprises at least one of a first first-level field entry, a first second-level field entry, a first third-level field entry, or a first category field entry;
searching, using the one or more computing device processors, a first repository, comprising first structured or unstructured data, for the first record with the at least one field entry;
determining, using the one or more computing device processors, whether the first record with the at least one field entry is present in the first structured or unstructured data comprised in the first repository;
in response to determining the first record with the at least one field entry is present in the first structured or unstructured data comprised in the first repository, creating, using the one or more computing device processors, based on the first record with the at least one field entry in the first structured or unstructured data, a snapshot query criterion;
searching, using the one or more computing device processors, based on the snapshot query criterion, a second repository comprising a first snapshot of the first structured or unstructured data;
comparing, using the one or more computing device processors, a second record with at least one second field entry, comprising at least one of a second first-level field entry, a second second-level field entry, a second third-level field entry, or a second category field entry, comprised in the first snapshot of the first structured or unstructured data with the first record with the at least one field entry comprised in the first structured or unstructured data; and
executing at least one of a data compression operation, a data decryption operation, or a data decoding operation associated with the first structured or unstructured data, wherein the at least one of the data compression operation, the data encryption operation, or the data decoding operation is isolated from the requesting computing device.

7. The method of claim 6, wherein: in response to determining that the first record with the at least one field entry at least partially matches the second record with the at least one second field entry, determining, using the one or more computing device processors, whether first version information associated with the first snapshot of the first structured or unstructured data is available.

8. The method of claim 7, wherein: in response to determining the first version information associated with the first snapshot of the first structured or unstructured data is not available, adding, using the one or more computing device processors, second version information associated with the first structured or unstructured data to the second record with the at least one second field entry comprised in the second repository.

9. The method of claim 6, further comprising transmitting, using the one or more computing device processors, to the requesting computing device, information associated with the second record with the at least one second field entry.

10. The method of claim 6, wherein the searching, using the one or more computing device processors, the first repository and the determining, using the one or more computing device processors, whether the first record with the at least one field entry is present in the first structured or unstructured data comprised in the first repository occur contemporaneously.

11. The method of claim 6, wherein the searching, using the one or more computing device processors, based on the snapshot query criterion, the second repository comprising the first snapshot of the first structured or unstructured data and the determining, using the one or more computing device processors, whether the second record with the at least one second field entry, comprising the at least one of the second first-level field entry, the second second-level field entry, the second third-level field entry, or the second category field entry, comprised in the first snapshot of the first structured or unstructured data at least partially matches the first record with the at least one field entry comprised in the first structured or unstructured data occur at least partially contemporaneously.

12. A method comprising:
receiving, using one or more computing device processors, from a requesting computing device, a first request for a first record with at least one field entry, wherein the first record with the at least one field entry comprises at least one of a first first-level field entry, a first second-level field entry, a first third-level field entry, or a first category field entry;

searching, using the one or more computing device processors, a first repository, comprising first structured or unstructured data, for the first record with the at least one field entry;

determining, using the one or more computing device processors, whether the first record with the at least one field entry is present in the first structured or unstructured data comprised in the first repository;

in response to determining the first record with the at least one field entry is present in the first structured or unstructured data comprised in the first repository, creating, using the one or more computing device processors, based on the first record with the at least one field entry in the first structured or unstructured data, a snapshot query criterion;

searching, using the one or more computing device processors, based on the snapshot query criterion, a second repository comprising a first snapshot of the first structured or unstructured data;

comparing, using the one or more computing device processors, a second record with at least one second field entry, comprising at least one of a second first-level field entry, a second second-level field entry, a second third-level field entry, or a second category field entry, comprised in the first snapshot of the first structured or unstructured data with the first record with the at least one field entry comprised in the first structured or unstructured data;

automatically executing at least one of a tagging or coding operation on the first structured or unstructured data, resulting in at least one of a first tagging decision or a first coding decision; and creating a second snapshot of the at least one of the first tagging decision or the first coding decision, wherein the at least one of the first tagging decision or the first coding decision is not modified by creating of a third record with at least one third field entry or adding of version information associated with the first structured or unstructured data to the third record with the at least one third field entry.

13. The method of claim 12, further comprising: in response to determining that the first record with the at least one field entry does not at least partially match the second record with the at least one second field entry, creating, using the one or more computing device processors, the third record with the at least one third field entry, matching the first record with the at least one field entry, in the second repository, wherein the creating comprises adding, using the one or more computing device processors, the version information associated with the first structured or unstructured data to the third record with the at least one third field entry comprised in the second repository.

14. The method of claim 13, further comprising: transmitting, using the one or more computing device processors, to the requesting computing device, reference information associated with the third record with the at least one third field entry, wherein the reference information either points to or is used to locate the third record with the at least one third field entry.

15. A system comprising:
one or more computing system processors; and
at least one memory storing instructions, that when executed by the one or more computing system processors cause the one or more computing system processors to:
receive from a requesting computing device, a first request for a first record with at least one field entry, wherein the first record with the at least one field entry comprises at least one of a first first-level field entry, a first second-level field entry, a first third-level field entry, or a first category field entry;
search a first repository, comprising first structured or unstructured data, for the first record with the at least one field entry;
determine whether the first record with the at least one field entry is present in the first structured or unstructured data comprised in the first repository;
in response to determining the first record with the at least one field entry is present in the first structured or unstructured data comprised in the first repository, create, based on the first record with the at least one field entry in the first structured or unstructured data, a snapshot query criterion;
search, based on the snapshot query criterion, a second repository comprising a first snapshot of the first structured or unstructured data;
compare a second record with at least one second field entry, comprising at least one of a second first-level field entry, a second second-level field entry, a second third-level field entry, or a second category field entry, comprised in the first snapshot of the first structured or unstructured data with the first record with the at least one field entry comprised in the first structured or unstructured data; and
execute at least one of a data compression operation, a data decryption operation, or a data decoding operation associated with the first structured or unstructured data, wherein the at least one of the data compression operation, the data encryption operation, or the data decoding operation is isolated from the requesting computing device.

16. The system of claim 15, wherein the one or more computing system processors are further configured to: in response to determining that the first record with the at least one field entry at least partially matches the second record with the at least one second field entry, determine whether version information associated with the first snapshot of the first structured or unstructured data is available.

17. The system of claim 16, wherein the one or more computing system processors are further configured to: in response to determining the version information associated with the first snapshot of the first structured or unstructured data is available, transmit to the requesting computing device, a snapshot reference to the second record with the at least one second field entry comprised in the second repository.

18. The method of claim 6, wherein: in response to determining the second record needs to be modified based on the comparing, selectively modifying, based on the first structured or unstructured data comprised in the first repository, the second record with the at least one second field entry comprised in the first snapshot comprised in the second repository, thereby resulting in modification of the first snapshot comprised in the second repository, wherein the selectively modifying the second record does not affect a third record comprised in the first snapshot in a third repository, wherein a first reference pointer associated with the second record remains static upon the selectively modifying the second record.

\* \* \* \* \*